(12) United States Patent
Maeda et al.

(10) Patent No.: US 8,219,431 B2
(45) Date of Patent: Jul. 10, 2012

(54) WORKFLOW MANAGEMENT SYSTEM, METHOD AND DEVICE FOR MANAGING A WORKFLOW INCLUDING PLURAL HIERARCHICALLY-CLASSIFIED TASKS

(75) Inventors: Kaoru Maeda, Chiba (JP); Takeshi Suzuki, Kanagawa (JP); Harald Holz, Kaiserslautern (DE); Oleg Rostanin, Kaiserslautern (DE)

(73) Assignee: Ricoh Company, Ltd., Tokyo (JP)

( * ) Notice: Subject to any disclaimer, the term of this patent is extended or adjusted under 35 U.S.C. 154(b) by 1380 days.

(21) Appl. No.: 11/647,289

(22) Filed: Dec. 29, 2006

(65) Prior Publication Data
US 2007/0174342 A1 Jul. 26, 2007

(30) Foreign Application Priority Data

Jan. 11, 2006 (JP) ................................. 2006-003497

(51) Int. Cl.
*G06F 17/00* (2006.01)
(52) U.S. Cl. ........................................................ 705/7.13
(58) Field of Classification Search ............... 705/9, 7.13
See application file for complete search history.

(56) References Cited

U.S. PATENT DOCUMENTS

| | | | | |
|---|---|---|---|---|
| 5,630,069 A * | 5/1997 | Flores et al. | ...................... | 705/7 |
| 6,308,163 B1 | 10/2001 | Du et al. | | |
| 2006/0074737 A1* | 4/2006 | Shukla et al. | ..................... | 705/8 |

FOREIGN PATENT DOCUMENTS

| | | |
|---|---|---|
| JP | 2000-048072 | 2/2000 |
| JP | 2005-276170 | 10/2005 |
| WO | WO 2004/086163 A2 | 10/2004 |

OTHER PUBLICATIONS

Fakas et al, "A Peer to Peer (P2P) Architecture for Dynamic Workflow Management", Elsevier Information and Software Technology, Vo. 46, No. 6, May 1, 2004, pp. 423-431.
Japanese Office Action dated Jan. 25, 2011.
Hayami et al., "Inter-workflow Management and Support"; NTT R&D, vol. 45, No. 12, pp. 1301-1314; 1996.

* cited by examiner

*Primary Examiner* — Thomas Dixon
(74) *Attorney, Agent, or Firm* — Dickstein Shapiro LLP

(57) ABSTRACT

A workflow management system is disclosed that is suitable to manage a workflow including plural hierarchically-classified tasks and especially for cooperative work spread over different organizations. The workflow management system includes a task receiving unit to receive designation of a task to be delegated, a delegatee receiving unit to receive designation of a delegatee, an acceptance receiving unit to receive acceptance of a delegation from the delegatee, a first processor that allows a delegator to hide a delegated task and a subordinate task, and allows the delegator to confirm status of the designated task, and a second processor that allows the delegator and the delegatee to refer to other tasks relevant to the delegated task.

19 Claims, 37 Drawing Sheets

After task delegation

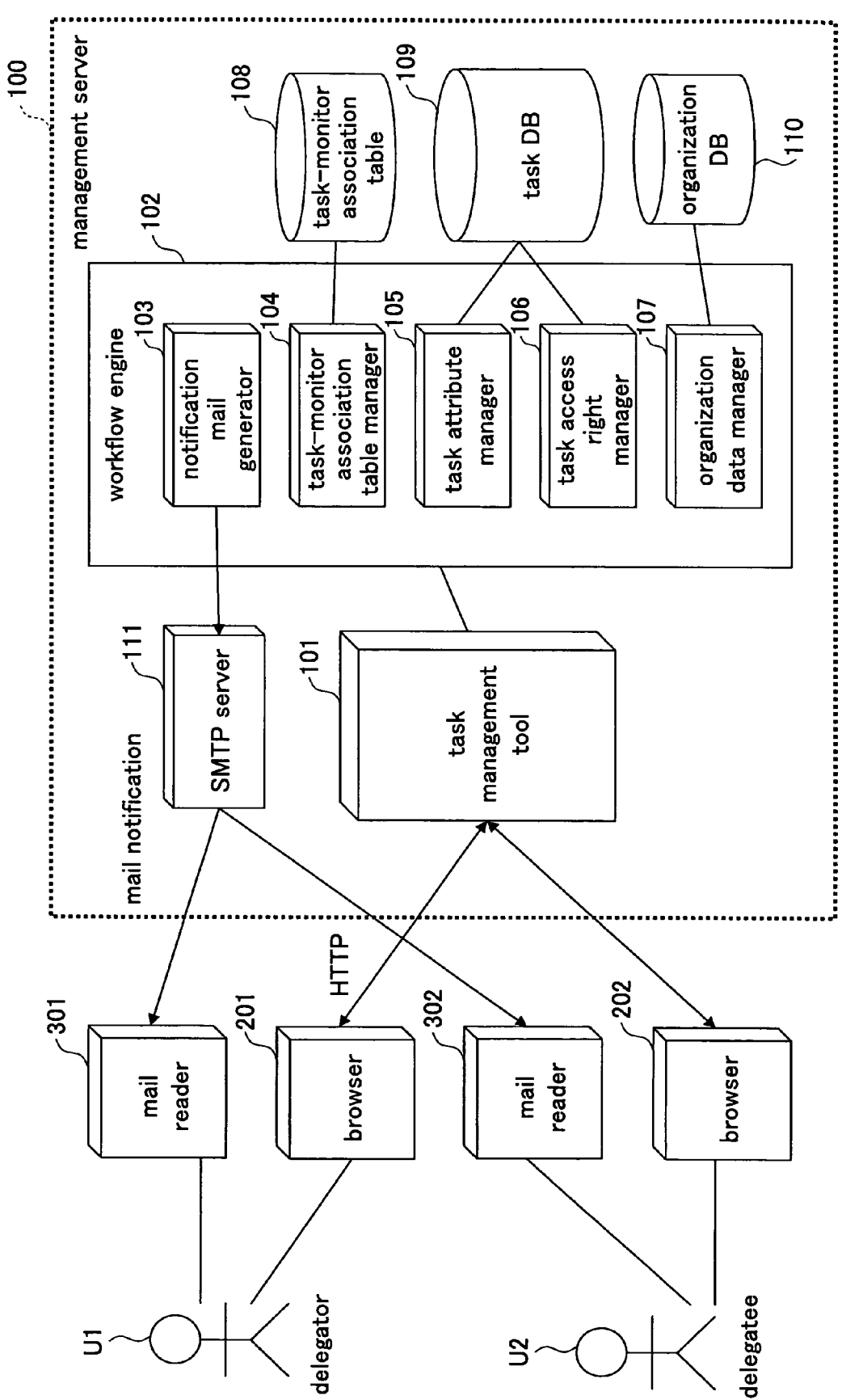

FIG.3

| attribute name | attribute value (examples) | remarks |
|---|---|---|
| task ID | 10010 | uniquely identified ID |
| task name | review a specification | |
| parent task ID | 9822 | task ID of parent task or null |
| child task ID | 10011, 10012 | list of task ID of child tasks (might be empty) |
| preceding task ID | 10003 | list of task ID of preceding tasks (might be empty) |
| task status | Processible | one of processible, waiting for preceding task, finished, in work, waiting for completion, declination, invisible |
| task owner | Maeda | user ID (singular) |
| due date | 2005/03/22 | date |
| completion date | null | date when task is completed or null |
| new task | false | truth value |
| relevant information item ID | 3022, 3033 | ID of relevant information project |
| monitor task ? | false | truth value |
| delegated task ? | false | truth value |
| task-monitor association ID | null | ID of task-monitor association table or null |
| comment | null | character string value |
| read access right holder | null | IDs of read-allowed users (plural) other than owner |

FIG.4

| attribute name | attribute value (examples) | remarks |
|---|---|---|
| task-monitor association ID | 1011 | uniquely identified ID |
| task ID of delegated task | 10010 | task ID of task to be delegated |
| task ID of monitor task | 10032 | task ID of corresponding monitor task |
| delegator user | Maeda | user ID of user making delegation |
| delegatee user | Suzuki | user ID of user requested by delegator user |
| mail notification of request acceptance | true | mail notification to delegator user when delegation is accepted (truth value) |
| mail notification of request declination | true | mail notification to delegator user when delegation is declined |
| mail notification of completion | true | mail notification to delegator user when task is completed |
| mail notification of deletion | true | mail notification to delegator user when task is deleted |
| mail notification of date modification | true | mail notification to delegator user when due date is modified |

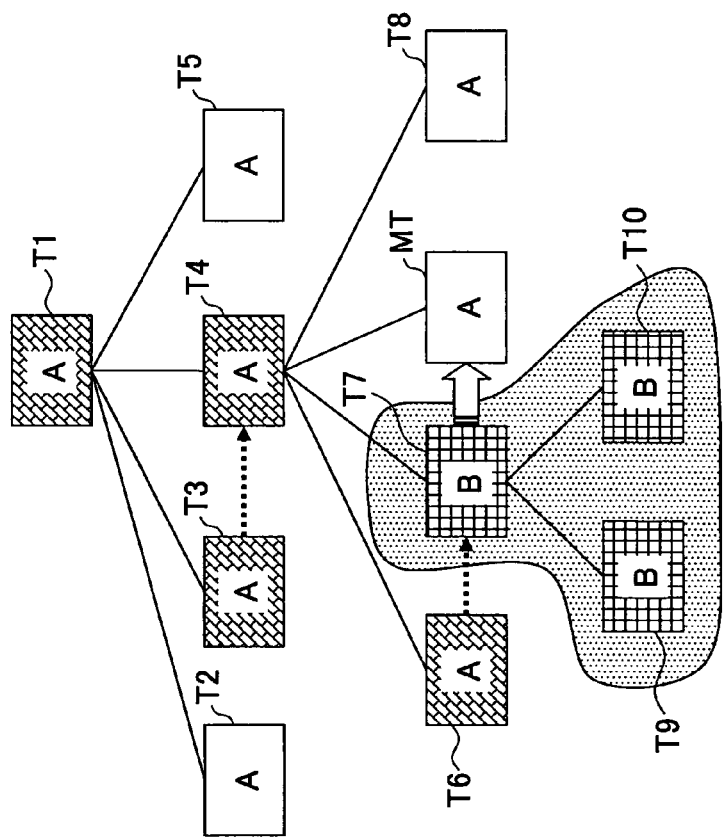
FIG.5A Before task delegation
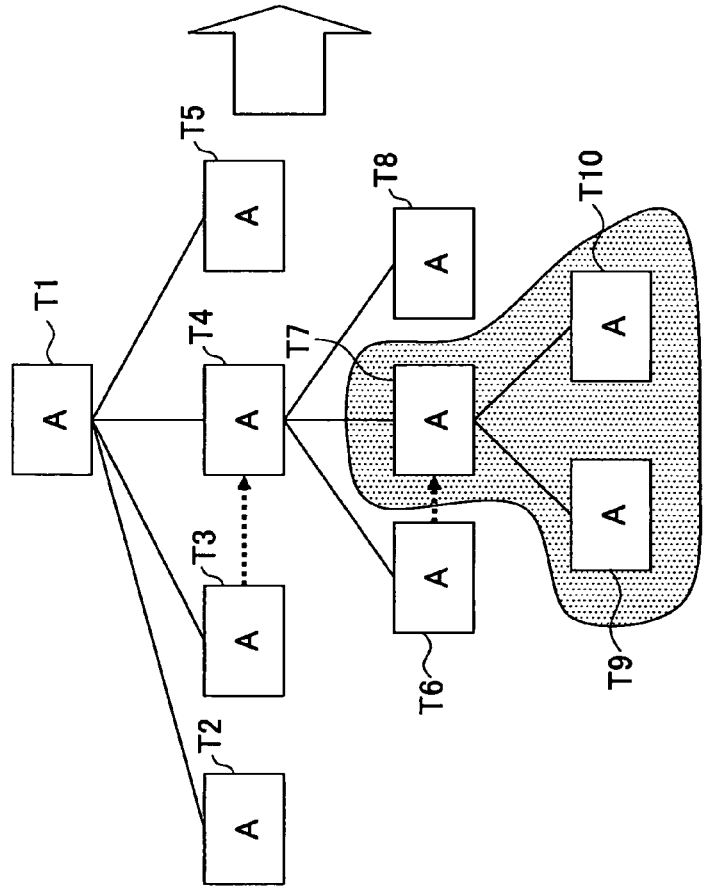
FIG.5B After task delegation

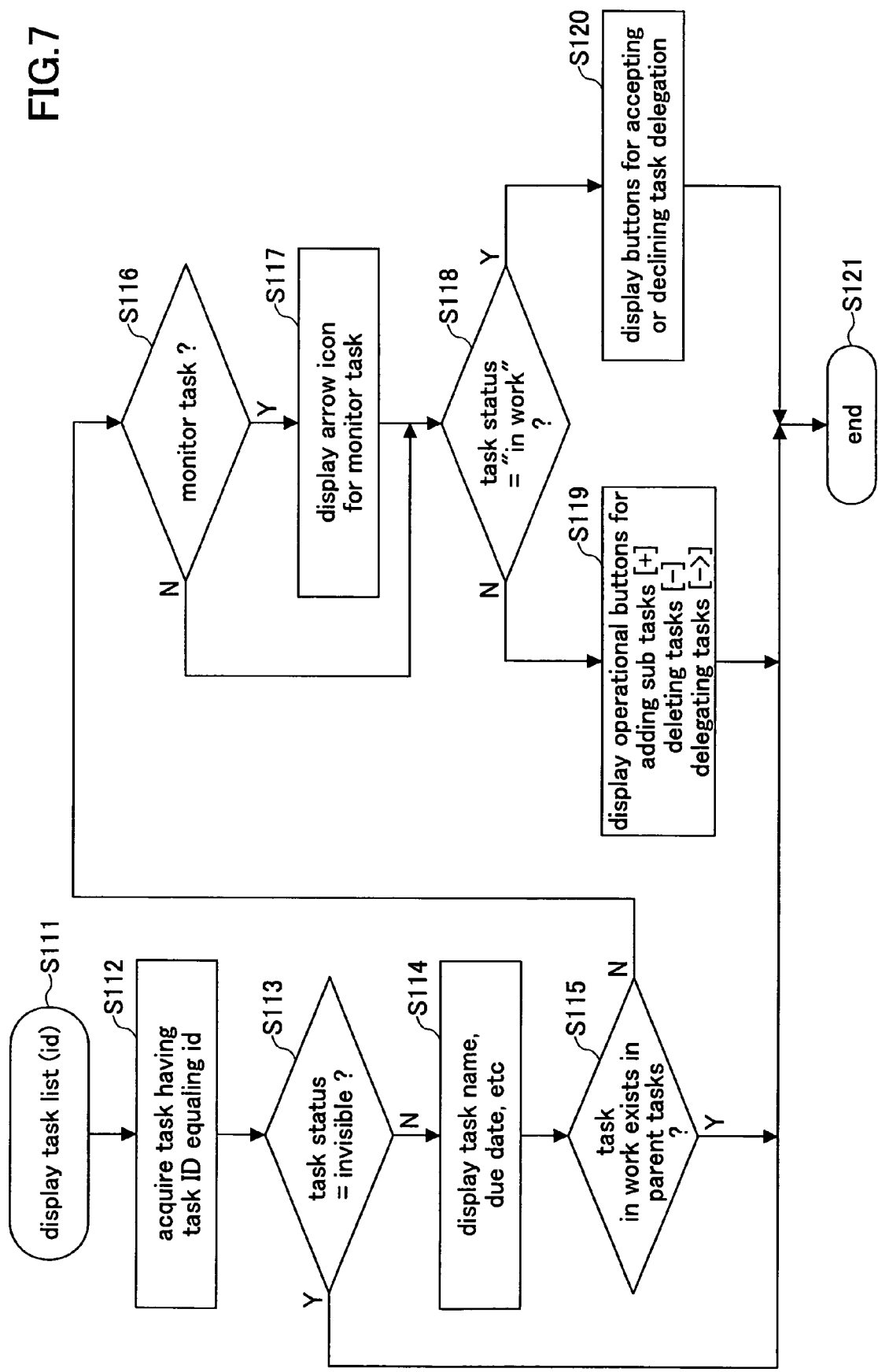

FIG.8

Work Items list  User:Maeda

Work Item List | Delegated tasks | Work Item Tree

Task Hierarchy

Expand All | Collapse All

◇ User tasks >

| Focus | Task | Entry | Priority | Due Date | Status | Actions |
|---|---|---|---|---|---|---|
| | ▼ DelegationDemoRoot | | | | in work | (+)(−)(↑) |
| | ⎯ DelegationDemo1 | | | | completed | (+)(−)(↑) |
| ◇ | ▼ DelegationDemo3 | ✱✱✱ | | | processible | (+)(−)(↑) ←403 |
| ◇ | ▼ DelegationDemo3-2 | ✱✱✱ | | | initiated | (+)(−)(↑) |
| | DelegationDemo3-2-2 | ✱✱✱ | | | initiated | (+)(−)(↑) |
| | DelegationDemo3-2-1 | | | | initiated | (+)(−)(↑) |
| | DelegationDemo3-1 | | | | processible | (+)(−)(↑) |
| | DelegationDemo3-3 | | | | completed | (+)(−)(↑) |
| | DelegationDemo2 | | | | processible | (+)(−)(↑) |
| | DelegationDemo4 | | | | | |

Work Item List | Delegated tasks | Work Item Tree

Work Item List | Preferences | Process Type Library | Logout

FIG.11

| task ID | 10010 |
|---|---|
| task name | review a specification |
| parent task ID | 9822 |
| child task ID | 10011, 10012 |
| preceding task ID | 10003 |
| task status | Processable |
| task owner | Maeda |
| due date | 2005/03/22 |
| completion date | null |
| new task | false |
| relevant information item ID | 3022, 3033 |
| monitor task ? | false |
| delegated task ? | false |
| task-monitor association ID | null |
| comment | null |
| read access right holder | null |

FIG.15A

Delegated task

| task ID | 10010 |
|---|---|
| task name | review a specification |
| parent task ID | 9822 |
| child task ID | 10011, 10012 |
| preceding task ID | 10003 |
| task status | in work |
| task owner | Suzuki |
| due date | 2005/03/22 |
| completion date | null |
| new task | true |
| relevant information item ID | 3022, 3033 |
| monitor task ? | false |
| delegated task ? | true |
| task-monitor association ID | 1011 |
| comment | null |
| read access right holder | null |

FIG.15B

Monitor task

| task ID | 10032 |
|---|---|
| task name | review a specification |
| parent task ID | 9822 |
| child task ID | null |
| preceding task ID | null |
| task status | in work |
| task owner | Maeda |
| due date | 2005/03/22 |
| completion date | null |
| new task | false |
| relevant information item ID | 3022, 3033 |
| monitor task ? | true |
| delegated task ? | false |
| task-monitor association ID | 1011 |
| comment | null |
| read access right holder | null |

FIG.18

Tasks    User: Maeda

| My Tasks | Delegated tasks | Task Hierarchy |

Delegated Tasks

| Priority | Task | Due Date | State | Delegated To | Actions |
|---|---|---|---|---|---|
| | DelegationDemo3-2 | | delegated | Takeshi Suzuki | (−) |
| | Send encrypted password to Karl (Harald) | | completed | Harald Holz | (−) |
| | Deletest1 | | processible | Oleg Rostanin | (−) |

431

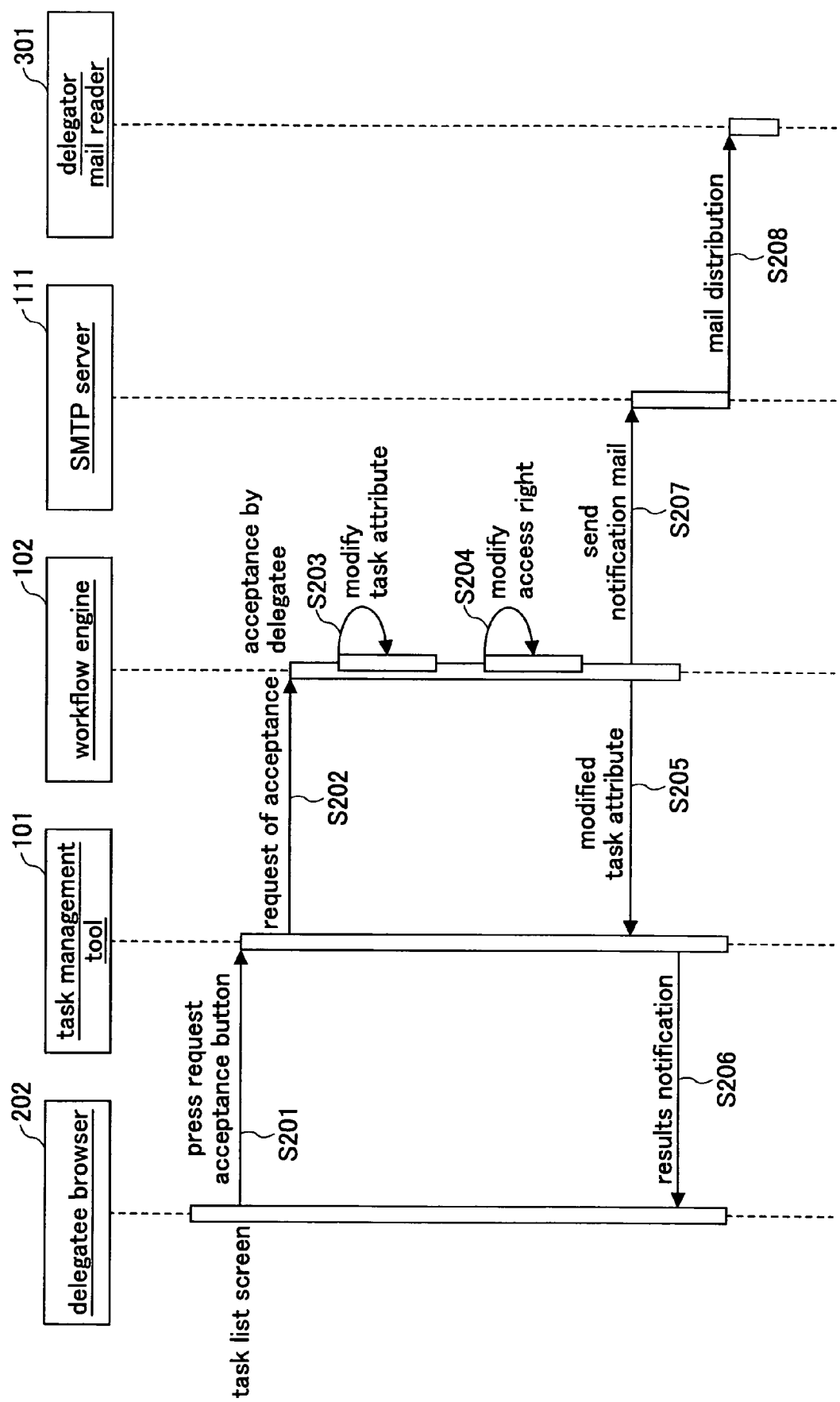

FIG.21A

Delegated task

| task ID | 10010 |
|---|---|
| task name | review a specification |
| parent task ID | 9822 |
| child task ID | 10011, 10012 |
| preceding task ID | 10003 |
| task status | in work |
| task owner | Suzuki |
| due date | 2005/03/22 |
| completion date | null |
| new task | true |
| relevant information item ID | 3022, 3033 |
| monitor task ? | false |
| delegated task ? | true |
| task-monitor association ID | 1011 |
| comment | null |
| read access right holder | null |

FIG.21B

Monitor task

| task ID | 10032 |
|---|---|
| task name | review a specification |
| parent task ID | 9822 |
| child task ID | null |
| preceding task ID | null |
| task status | in work |
| task owner | Maeda |
| due date | 2005/03/22 |
| completion date | null |
| new task | false |
| relevant information item ID | 3022, 3033 |
| monitor task ? | true |
| delegated task ? | false |
| task-monitor association ID | 1011 |
| comment | null |
| read access right holder | null |

FIG.25A

Delegated task

| task ID | 10010 |
|---|---|
| task name | review a specification |
| parent task ID | 9822 |
| child task ID | 10011, 10012 |
| preceding task ID | 10003 |
| task status | Processible |
| task owner | Suzuki |
| due date | 2005/03/22 |
| completion date | null |
| new task | false |
| relevant information item ID | 3022, 3033 |
| monitor task ? | false |
| delegated task ? | true |
| task-monitor association ID | 1011 |
| comment | null |
| read access right holder | null |

FIG.25B

Monitor task

| task ID | 10032 |
|---|---|
| task name | review a specification |
| parent task ID | 9822 |
| child task ID | null |
| preceding task ID | null |
| task status | Waiting for completion |
| task owner | Maeda |
| due date | 2005/03/22 |
| completion date | null |
| new task | false |
| relevant information item ID | 3022, 3033 |
| monitor task ? | true |
| delegated task ? | false |
| task-monitor association ID | 1011 |
| comment | null |
| read access right holder | null |

FIG.27

Work Items list                                                                                      User: Suzuki Work Item List | Delegated tasks | Work Item Tree Task Hierarchy Expand All | Collapse All ◇ User tasks >

| Focus | Task | Entry | Priority 📅 | Due Date | Status | Actions |
|---|---|---|---|---|---|---|
| ▼ | DelegationDemo3-2 | *** | | | initiated | ⊕ ⊖ ↑ |
| | DelegationDemo3-2-2 | *** | | | initiated | ⊕ ⊖ ↑ |
| | DelegationDemo3-2-1 | *** | | | initiated | ⊕ ⊖ ↑ |

Work Item List | Delegated tasks | Work Item Tree

Work Item List | Preferences | Process Type Library | Logout

Delegated task

| task ID | 10010 |
|---|---|
| task name | review a specification |
| parent task ID | 9822 |
| child task ID | 10011, 10012 |
| preceding task ID | 10003 |
| task status | in work |
| task owner | Suzuki |
| due date | 2005/03/22 |
| completion date | null |
| new task | true |
| relevant information item ID | 3022, 3033 |
| monitor task ? | false |
| delegated task ? | true |
| task-monitor association ID | 1011 |
| comment | null |
| read access right holder | null |

FIG.29B

Monitor task

| task ID | 10032 |
|---|---|
| task name | review a specification |
| parent task ID | 9822 |
| child task ID | null |
| preceding task ID | null |
| task status | in work |
| task owner | Maeda |
| due date | 2005/03/22 |
| completion date | null |
| new task | false |
| relevant information item ID | 3022, 3033 |
| monitor task ? | true |
| delegated task ? | false |
| task-monitor association ID | 1011 |
| comment | null |
| read access right holder | null |

FIG.32A

Delegated task

| task ID | 10010 |
|---|---|
| task name | review a specification |
| parent task ID | 9822 |
| child task ID | 10011, 10012 |
| preceding task ID | 10003 |
| task status | Declination |
| task owner | Maeda |
| due date | 2005/03/22 |
| completion date | null |
| new task | false |
| relevant information item ID | 3022, 3033 |
| monitor task ? | false |
| delegated task ? | false |
| task-monitor association ID | 1011 |
| comment | null |
| read access right holder | null |

FIG.32B

Monitor task

| task ID | 10032 |
|---|---|
| task name | review a specification |
| parent task ID | 9822 |
| child task ID | null |
| preceding task ID | null |
| task status | invisible |
| task owner | Maeda |
| due date | 2005/03/22 |
| completion date | null |
| new task | false |
| relevant information item ID | 3022, 3033 |
| monitor task ? | true |
| delegated task ? | false |
| task-monitor association ID | 1011 |
| comment | null |
| read access right holder | null |

FIG.36A

Delegated task

| task ID | 10010 |
|---|---|
| task name | review a specification |
| parent task ID | 9822 |
| child task ID | 10011, 10012 |
| preceding task ID | 10003 |
| task status | completion |
| task owner | Suzuki |
| due date | 2005/03/26 |
| completion date | 2005/03/25 |
| new task | false |
| relevant information item ID | 3022, 3033 |
| monitor task ? | false |
| delegated task ? | true |
| task-monitor association ID | 1011 |
| comment | Change module B |
| read access right holder | null |

FIG.36B

Monitor task

| task ID | 10032 |
|---|---|
| task name | review a specification |
| parent task ID | 9822 |
| child task ID | null |
| preceding task ID | null |
| task status | completion |
| task owner | Maeda |
| due date | 2005/03/26 |
| completion date | 2005/03/25 |
| new task | false |
| relevant information item ID | 3022, 3033 |
| monitor task ? | true |
| delegated task ? | false |
| task-monitor association ID | 1011 |
| comment | Change module B |
| read access right holder | null |

Copy data

WORKFLOW MANAGEMENT SYSTEM, METHOD AND DEVICE FOR MANAGING A WORKFLOW INCLUDING PLURAL HIERARCHICALLY-CLASSIFIED TASKS

BACKGROUND OF THE INVENTION

1. Field of the Invention

The present invention relates to a workflow management system suitable for cooperative work spread over different organizations.

2. Description of the Related Art

FIG. 1A and FIG. 1B are block diagrams illustrating a workflow model in the related art.

Specifically, FIG. 1A illustrates a workflow model of a fixed type. The entire flow, which includes five tasks T1 through T5, is completely defined as a workflow before being performed, and the order relationship (illustrated by arrow solid lines in FIG. 1A) of the tasks T1 through T5 is also defined when defining the workflow. Further, the number and configuration of the tasks do not change when the workflow is performed.

As for assignment of persons who perform the workflow, it is made as described below. A definition of the workflow is designed beforehand, persons who perform the workflow have roles defined in the workflow, and operations to be carried out are defined. When the workflow is performed, persons are assigned corresponding to the defined roles. Then, mail is sent to the assigned persons to notify them of the assignments, and newly assigned persons can choose to either accept or decline the assignments.

FIG. 1B illustrates a so-called AKW (Agile Knowledge Workflow) model, in which sub-tasks are added or deleted; thus the workflow is partially broken up (recursive division of sub tasks) while being performed, and flow control is performed based on a parent-child relationship and an order relationship of the tasks, and dependence of the input and output documents. For example, among tasks T2 trough T4, which are children of task T1, task T3 is further divided into tasks T5 and T6 while being performed. The order of performing the tasks is determined from the parent-child relationship and the explicit order relationship (precedence task relationship) of the tasks. In FIG. 1B, the order relationship is indicated by arrowed dashed lines.

As for assignment of persons who perform the workflow, tasks are added while the workflow is being performed, and persons who perform the workflow are assigned accordingly. Only summary and goal of the tasks are shown to be assigned to persons, and these persons carry out their work while the workflow is further divided. Similarly, a mail message is sent to the assigned persons to notify them of the assignments, and newly assigned persons can choose to either accept or decline the assignments.

The fixed-type workflow model, as shown in FIG. 1A, is suitable for typical work which can be classified in advance, whereas the AKW model as shown in FIG. 1B is suitable for work requiring high flexibility, which cannot be specifically analyzed and modeled in advance.

However, for cooperative work, or work without a specific solution procedure shared by different organizations, the above-mentioned fixed-type workflow model and the AKW model suffer from the following problems.

First, for the cooperative work shared by different organizations, it is difficult to reach an agreement in advance about detailed definitions of the workflow, the required skills cannot be anticipated, and further the roles in the workflow cannot be defined beforehand. Hence, the fixed-type workflow model cannot be adopted. Of course, the AKW model is usable in this sense.

Second, sometimes, it is desired that detailed operating procedures not be disclosed to partners involved in the cooperative work, but neither the fixed-type workflow model nor the AKW model can meet this need; in other words, neither the fixed-type workflow model nor the AKW model can hide information when necessary. For example, the following information needs to be hidden when necessary.

Specific personnel performing the cooperative work, which information is related to inside personnel;

Configurations of the children tasks, which information is related to specialized knowledge and technical know-how information;

Schedule progress of the children tasks, which information reflects whether the tasks are finished in a hurry near the deadline or completed with leeway, and also reflects the amount of actual operations; and Intermediate outcomes, references, and other internal information required in the children tasks.

SUMMARY OF THE INVENTION

An embodiment of the present invention may solve one or more problems of the related art.

A preferred embodiment of the present invention may provide a workflow management system suitable for managing a workflow including plural hierarchically-classified tasks and for cooperative work spread over different organizations.

According to a first aspect of the present invention, there is provided a workflow management system for managing a workflow including a plurality of hierarchically-classified tasks, comprising:

a task receiving device configured to receive designation of a task to be delegated;

a delegatee receiving device configured to receive designation of a delegatee;

an acceptance receiving device configured to receive acceptance of a delegation from the delegatee;

a first processor that allows a delegator to hide a delegated task and a subordinate task, and allows the delegator to confirm status of the designated task; and a second processor that allows the delegator and the delegatee to refer to other tasks relevant to the delegated task.

As an embodiment, the first processor changes owners of the delegated task and the subordinate task to be the delegatee, and duplicates bibliographical information from the delegated task to create a monitor task accessible by the delegator.

As an embodiment, the first processor closes the monitor task when the delegated task is completed.

As an embodiment, the second processor additionally grants the right of reading other tasks relevant to the delegated task to the delegatee.

As an embodiment, the first processor sets the delegated task to be read-only relative to the delegator, and sets the right of access so that the subordinate task cannot be accessed by the delegator.

As an embodiment, the workflow management system further comprises a mail transmission device configured to send a notification mail message to the delegator when the delegation is accepted or rejected, the delegated task is completed or deleted, or a due date is changed.

As an embodiment, the task receiving device receives a task to be delegated through a task list screen when a task delegation button corresponding to said task is pressed on the task list screen.

As an embodiment, the delegatee receiving device receives a user as the delegatee through a delegatee selection screen when a delegatee selection button corresponding to the user is pressed on the delegatee selection screen.

As an embodiment, the acceptance receiving device receives the acceptance of the delegation when an acceptance button is pressed on a task list screen or a task details screen, and receives declination of the delegation when a declination button is pressed on the task list screen or the task details screen.

According to a second aspect of the present invention, there is provided a workflow management method for managing a workflow including a plurality of hierarchically-classified tasks, comprising:

a task receiving step of receiving designation of a task to be delegated;

a delegatee receiving step of receiving designation of a delegatee;

an acceptance receiving step of receiving acceptance of a delegation from the delegatee;

a first processing step of allowing a delegator to hide a delegated task and a subordinate task, and allowing the delegator to confirm status of the designated task; and a second processing step of allowing the delegator and the delegatee to refer to other tasks relevant to the delegated task.

According to a third aspect of the present invention, there is provided a workflow management device for managing a workflow including a plurality of hierarchically-classified tasks, comprising:

a task receiving unit configured to receive designation of a task to be delegated;

a delegatee receiving unit configured to receive designation of a delegatee;

an acceptance receiving unit configured to receive, from the delegatee, acceptance of a delegation;

a first processor that allows a delegator to hide a delegated task and a subordinate task, and allows the delegator to confirm status of the designated task; and a second processor that allows the delegator and the delegatee to refer to other tasks relevant to the delegated task.

According to the present invention, it is possible to provide a workflow management system suitable for cooperative work spread over different organizations while employing the AKW model or other models.

These and other objects, features, and advantages of the present invention will become more apparent from the following detailed description of preferred embodiments given with reference to the accompanying drawings.

BRIEF DESCRIPTION OF THE DRAWINGS

FIG. 2 is a block diagram illustrating a configuration of a workflow management system according to an embodiment of the present invention;

FIG. 3 is a table illustrating a data structure of the tasks managed by the task database 109;

FIG. 4 is a table illustrating a data structure of the task-monitor association table 108;

FIG. 5A and FIG. 5B are block diagrams illustrating the concept of a task delegation;

FIG. 7 is a flowchart illustrating the operations in step S105, in which the task management tool 101 displays the task list screen;

FIG. 8 is a schematic diagram exemplifying a task list screen 401;

FIG. 11 is a table illustrating a data structure of the tasks before delegation;

FIG. 15A is a table exemplifying data of the delegated task after delegation;

FIG. 15B is a table exemplifying data of the monitor task after delegation;

FIG. 18 is a schematic diagram exemplifying a task list screen 431 after the delegation is finished;

FIG. 20 is a sequence diagram illustrating operations of delegation acceptance;

FIG. 21A is a table exemplifying data of the delegated task before delegation acceptance;

FIG. 21B is a table exemplifying data of the monitor task before delegation acceptance;

FIG. 25A is a table exemplifying data of the delegated task after delegation acceptance;

FIG. 25B is a table exemplifying data of the monitor task after delegation acceptance;

FIG. 27 is a schematic diagram exemplifying a task details screen 511 on the delegate side after delegation acceptance;

FIG. 29A is a table exemplifying data of the delegated task before delegation declination;

FIG. 29B is a table exemplifying data of the monitor task before delegation declination;

FIG. 32A is a table exemplifying data of the delegated task after delegation declination;

FIG. 32B is a table exemplifying data of the monitor task after delegation declination;

FIG. 36A is a table exemplifying data of the delegated task after the delegated task is completed; and FIG. 36B is a table exemplifying data of the monitor task after the delegated task is completed.

DESCRIPTION OF THE PREFERRED EMBODIMENTS

Figure 1A:
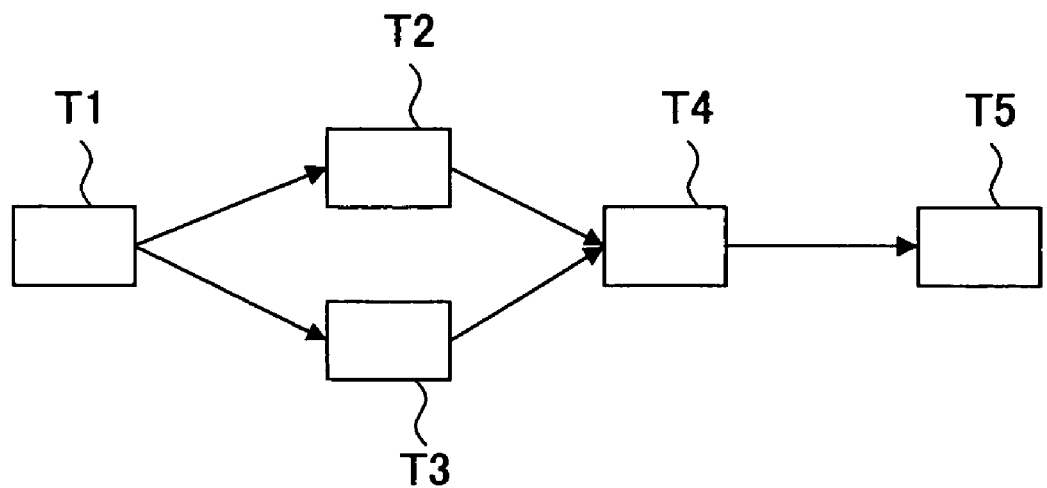
FIG. 1A and FIG. 1B are block diagrams illustrating a workflow model in the related art.
Figure 1B:
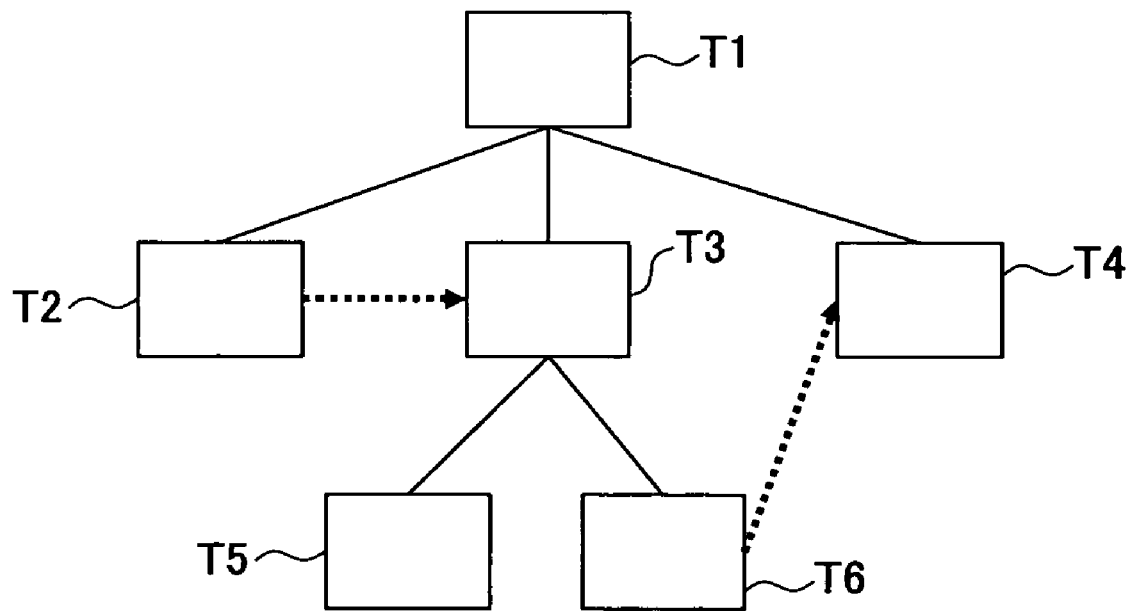

Below, preferred embodiments of the present invention are explained with reference to the accompanying drawings.
System Configuration FIG. 2 is a block diagram illustrating a configuration of a workflow management system according to an embodiment of the present invention.

The workflow management system as shown in FIG. 2 includes a management server 100 located on a network, a browser 201 and a mail reader 301, which are operated by a delegator U1, and can be connected to the management server 100 through a network, and a browser 202 and a mail reader 302, which are operated by a delegatee U2, and can be connected to the management server 100 through a network.

The management server 100 includes a task management tool 101, which serves as a front-end for the browsers 201, 202, a workflow engine 102 for workflow control, a number of databases (DB) 108 through 110, and an SMTP (Simple Mail Transfer Protocol) server 111 for mail notification.

The databases 108 through 110 include a task-monitor association table 108, which manages the association relationships between tasks constituting the workflow and monitor tasks for monitoring delegated tasks; a task database 109, which manages task information; and an organization database 110, which manages data of the organizations to which operators of the workflow belong.

The workflow engine 102 includes a notification mail generator 103, which creates notification mail for the SMTP server 111; a task-monitor association table manager 104, which manages the task-monitor association table 108; a task attribute manager 105, which manages task attributes; a task access right manager 106, which manages the right to access the tasks; and an organization data manager 107, which manages the organization data.

FIG. 3 is a table illustrating a data structure of the tasks managed by the task database 109.

As shown in FIG. 3, the data structure of the tasks under management includes columns of "attribute name", "attribute value (examples)", and "remarks".

For example, the column of "attribute name" includes items of "task ID", "task name", "parent task ID", "child task ID", "preceding task ID", "task status", "task owner", "due date", "completion date", "new task", "relevant information item ID", "monitor task ?", "delegated task ?", "task-monitor association ID", "comment", and "read access right holder".

The column of "attribute value" contains values of the items in the column of "attribute name". For example, in FIG. 3, the attribute value of "task ID" is "10010", that of "task name" is "review a specification", that of "parent task ID" is "9822", that of "child task ID" is "10011", "10012", that of "preceding task ID" is "10003", that of "task status" is "processible", that of "task owner" is "Maeda", that of "due date" is "2005/03/22", that of "completion date" is "null", that of "new task" is "false", that of "relevant information item ID" is "3022", "3033", that of "monitor task ?" is "false", that of "delegated task ?" is "false", that of "task-monitor association ID" is "null", that of "comment" is "null", and that of "read access right holder" is "null".

The column of "remarks" contains explanation of the items in the column of "attribute name". For example, in FIG. 3, the remarks of "task ID" is "uniquely identified ID", that of "parent task ID" is "task ID of parent task or null", that of "child task ID" is "list of task ID of child tasks (might be empty)", that of "preceding task ID" is "list of task ID of preceding tasks (might be empty)", that of "task status" is "one of processible, waiting for preceding task, finished, in work, waiting for completion, declination, invisible", that of "task owner" is "user ID (singular)", that of "due date" is "date", that of "completion date" is "date when task is completed or null", of "new task" is "truth value", that of "relevant information item ID" is "ID of relevant information project", that of "monitor task ?" is "truth value", that of "delegated task ?" is "truth value", that of "task-monitor association ID" is "ID of task-monitor association table or null", that of "comment" is "character string value", and that of "read access right holder" is "IDs of users (plural) allowed to read other than owner".

FIG. 4 is a table illustrating a data structure of the task-monitor association table 108.

As shown in FIG. 4, the task-monitor association table 108 includes columns of "attribute name", "attribute value (examples)", and "remarks".

For example, the column of "attribute name" includes items of "task-monitor association ID", "task ID of delegated task", "task ID of monitor task", "delegator user", "delegatee user", "mail notification of delegation acceptance", "mail notification of delegation declination", "mail notification of completion", "mail notification of deletion", and "mail notification of date change".

The column of "attribute value" contains values of the items in the column of "attribute name".

The column of "remarks" contains explanation of the items in the column of "attribute name". For example, in FIG. 4, the remarks of "task-monitor association ID" is "uniquely identified ID", that of "ID of delegated task" is "task ID of task to be delegated", that of "ID of monitor task" is "task ID of corresponding monitor task", that of "delegator user" is "user ID of user making delegation", that of "delegates user" "user ID of user requested by delegator user", that of "mail notification of delegation acceptance" is "mail notification to delegator user at the time of delegation acceptance (truth value)", that of "mail notification of delegation declination" is "mail notification to delegator user at the time of delegation declination", that of "mail notification of completion" is "mail notification to delegator user at the time of task completion", that of "mail notification of deletion" is "mail notification to delegator user at the time of task deletion", and that of "mail notification of date change" is "mail notification to delegator user when changing delivery date".

Concept of Task Delegation

FIG. 5A and FIG. 5B are block diagrams illustrating the concept of a task delegation.

Specifically, FIG. 5A illustrates a state before the task delegation, and FIG. 5B illustrates a state after the task delegation.

As shown in FIG. 5A, before the task delegation, owners of tasks T1 through T10 are a user A, and only the user A is allowed to access the tasks T1 through T10; under this condition, the user A delegates the task T7 to a user B.

In this case, as shown in FIG. 5B, because of an owner change, the task T7 and its subordinate tasks T9, T10 can only be accessed by the user B, and a monitor task MT for monitoring the status of the task T7 is created, and the monitor task MT can be accessed only by the user A, who is a delegator. The preceding tasks and parent tasks of the delegated task T7, that is, tasks T1, T3, T4, T6, can be accessed by both the user A and the user B.

In this way, the task T7 can completely determine completion or not, or other conditions of the delegated task T7; the user B, who executes the task 7, can obtain necessary information from the preceding tasks and parent tasks of the task T7, and can hide details of the information from the user A.

Processing on Delegator Side

Figure 6:
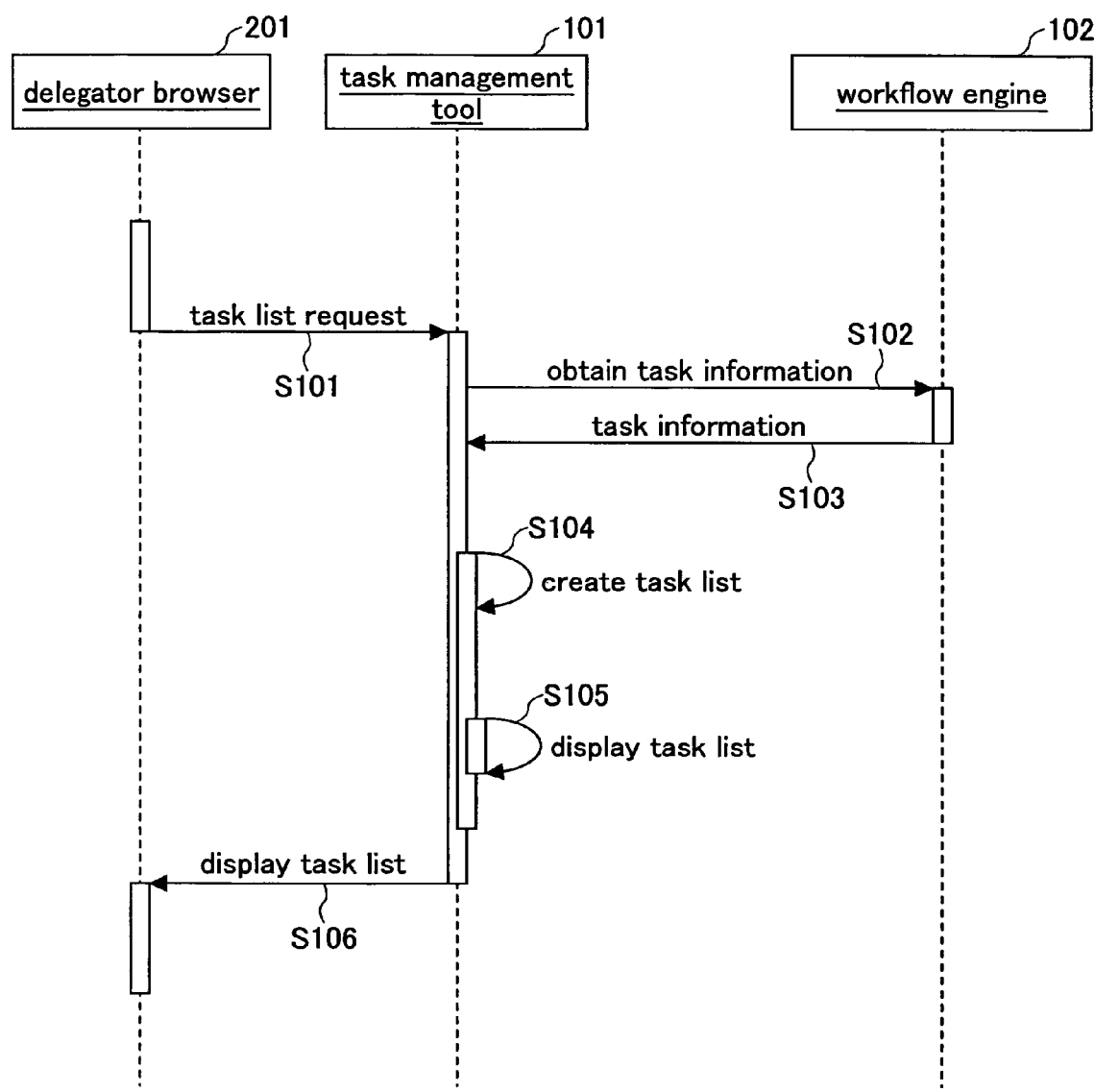
FIG. 6 is a sequence diagram illustrating operations on a task list screen on the delegator side.

FIG. 6 is a sequence diagram illustrating operations on a task list screen on the delegator side.

As shown in FIG. 6, in step S101, from the browser 201 of the delegator U1, a request to view a task list is made to the task management tool 101 of the management server 100.

In step S102 and step S103, the task management tool 101 obtains task information from the workflow engine 102.

In step S104, the task management tool 101 creates the task list screen data.

In step S105, the task management tool 101 displays the task list on a screen.

In step S106, the task management tool 101 sends data of the task list screen to the browser 201 of the delegator U1, and the task list is displayed by the browser 201.

FIG. 7 is a flowchart illustrating the operations in step S105, in which the task management tool 101 displays the task list screen.

As shown in FIG. 7, in step Sill, an "id" is specified to start the routine of displaying the task list screen.

In step S112, a task having a task ID equaling the specified "id" is acquired.

In step S113, it is determined whether the task status is invisible. If the task status is invisible, the routine ends in step S121. Otherwise, the routine proceeds to step S114.

In step S114, a task name, a due date, and other bibliographic information are displayed.

In step S115, it is determined whether parent tasks include a task in work.

If there is a task in work, the routine ends in step S121, otherwise, the routine proceeds to step S116.

In step S116, it is determined whether the task is a monitor task. If the task is a monitor task, the routine proceeds to step S117, otherwise, the routine proceeds to step S118.

In step S117, an arrow icon representing the monitor task is displayed.

In step S118, it is determined whether the task status is "in work". If the task status is "in work", the routine proceeds to step S120, otherwise, the routine proceeds to step S119.

In step Sl19, operational buttons for sub tasks addition, tasks deletion, and tasks delegation are displayed. Then, the routine ends in step S121.

In step S120, operational buttons for accepting or declining the delegated task are displayed. Then, the routine ends in step S121.

FIG. 8 is a schematic diagram exemplifying a task list screen 401.

As show in FIG. 8, task delegation buttons 403 are shown on the right side of a task list 402.

Figure 9:
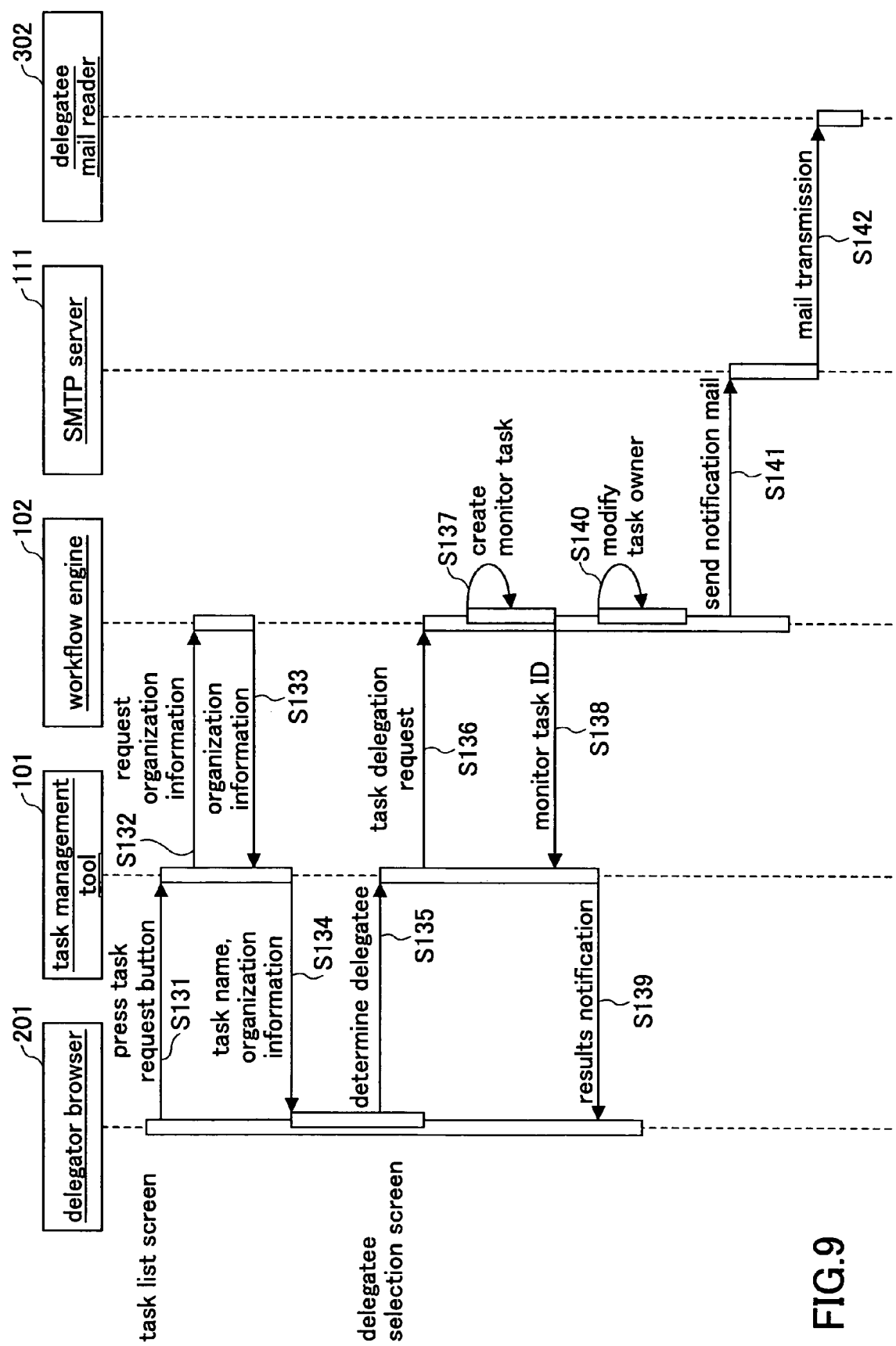
FIG. 9 is a sequence diagram illustrating operations of task delegation.

FIG. 9 is a sequence diagram illustrating operations of task delegation.

As shown in FIG. 9, in step S131, when a task delegation button 403 is pressed on the task list screen 401 on the browser 201 of the delegator U1, this action is reported to the task management tool 101.

In step S132 and step S133, the task management tool 101 requests organization information from the workflow engine 102.

In step S134, a delegatee selection screen including task names and organization information is displayed.

In step S135, the delegator U1 selects a delegatee from the delegatee selection screen on the browser 201 of the delegator U1.

In step S136, the task management tool 101 sends a request for task delegation to the workflow engine 102.

In step S137, the workflow engine 102 creates a monitor task.

In step S138, a monitor task ID is returned to the task management tool 101.

In step S139, the task management tool 101 notifies the browser 201 of the delegator U1 of the results.

In step S140, the workflow engine 102 changes the owner of the delegated task.

In step S141, the workflow engine 102 requests the SMTP server 111 to send a notification mail.

In step S142, the SMTP server 111 sends the mail to the mail reader 302 of the delegatee U2.

Figure 10:
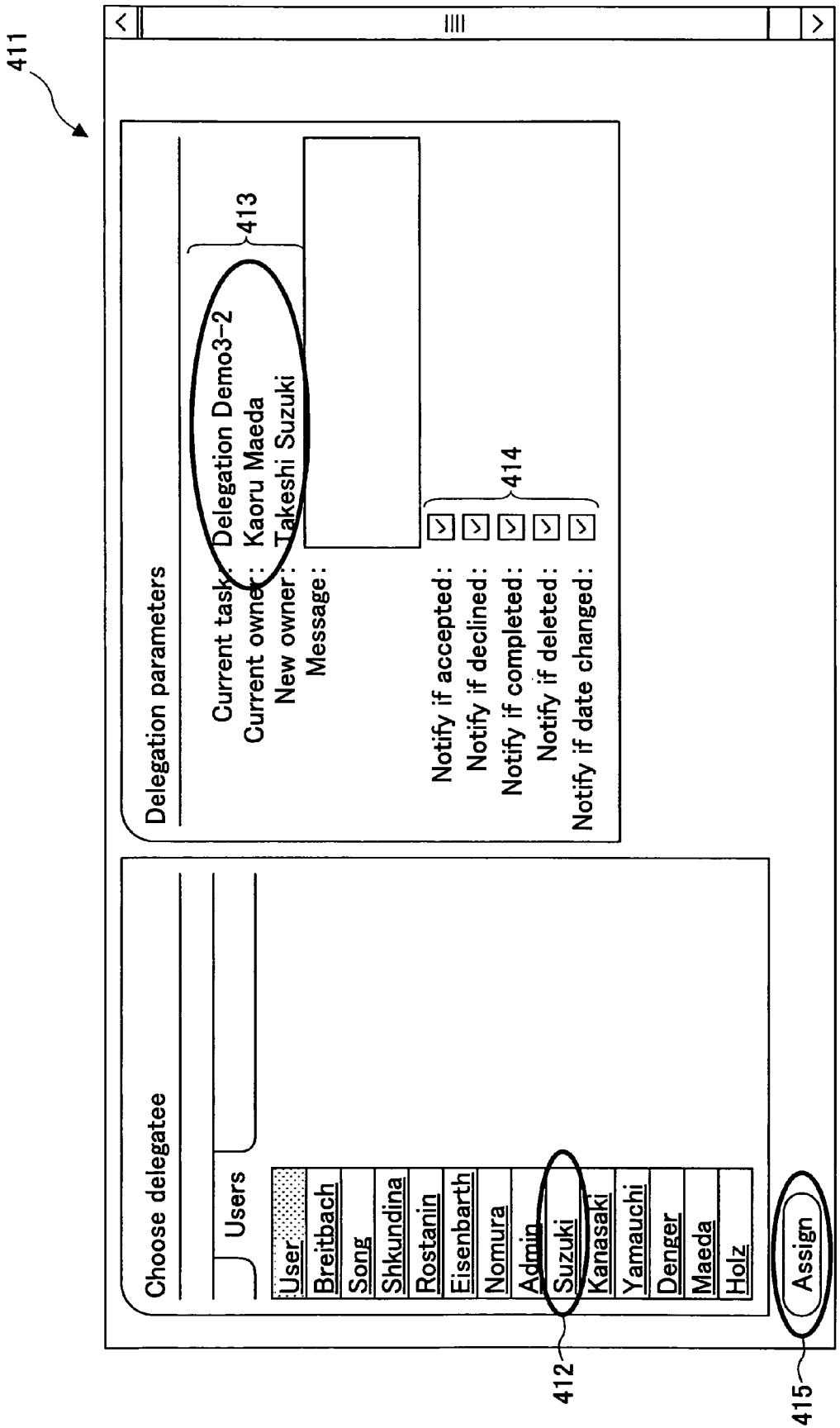
FIG. 10 is a schematic diagram exemplifying a delegatee selection screen 411.

FIG. 10 is a schematic diagram exemplifying a delegatee selection screen 411.

As show in FIG. 10, there are delegatee selection buttons 412, task information 413, mail notification setting check boxes 414, and a delegatee assigning button 415 on the delegatee selection screen 411.

FIG. 11 is a table illustrating a data structure of the tasks before delegation.

Figure 12:
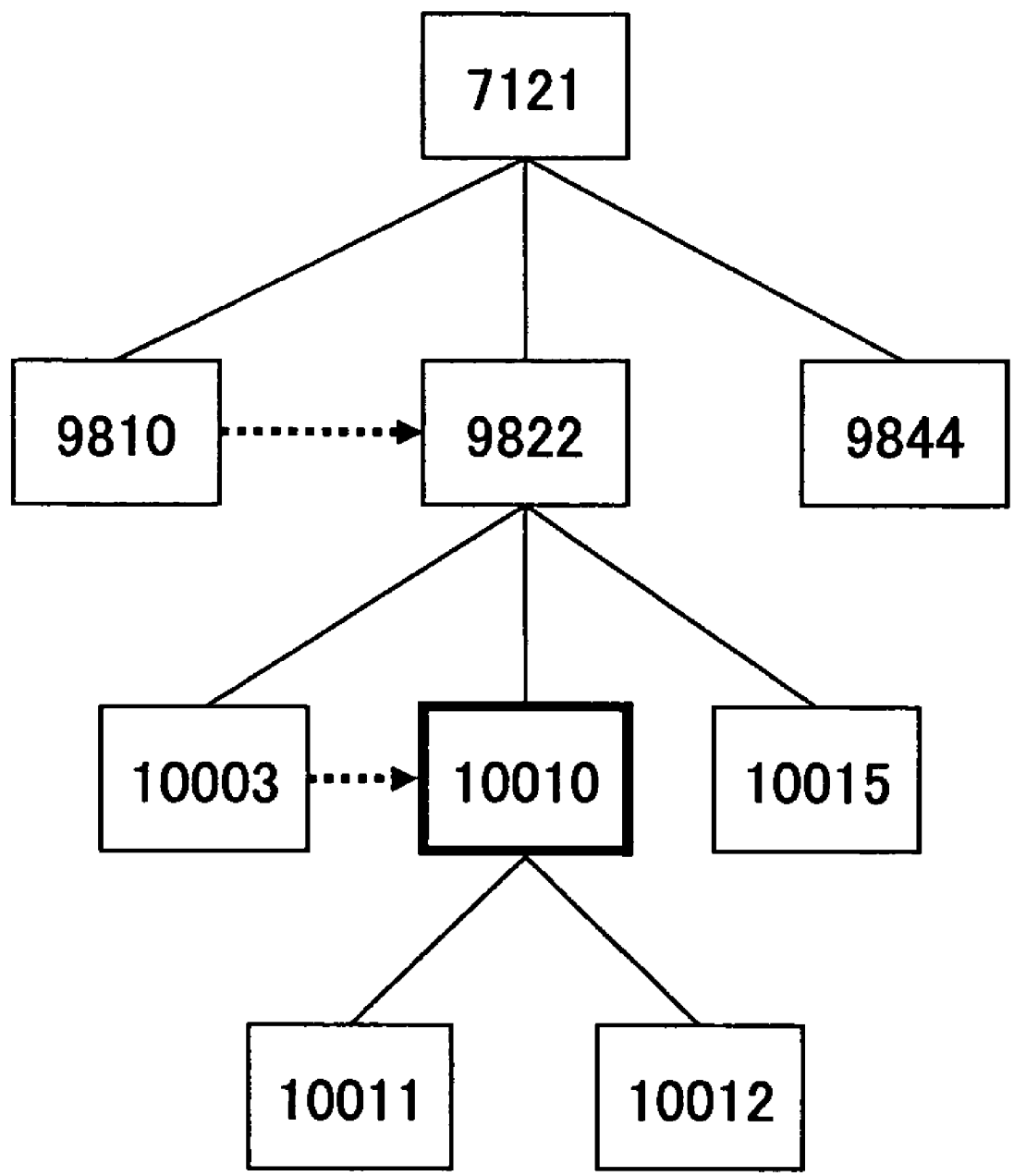
FIG. 12 is a block diagram illustrating the structure of the tasks before delegation.

FIG. 12 is a block diagram illustrating the structure of the tasks before delegation.

Here, the delegated task is the task indicated by a thick frame and has a task ID of 10010.

Figure 13:
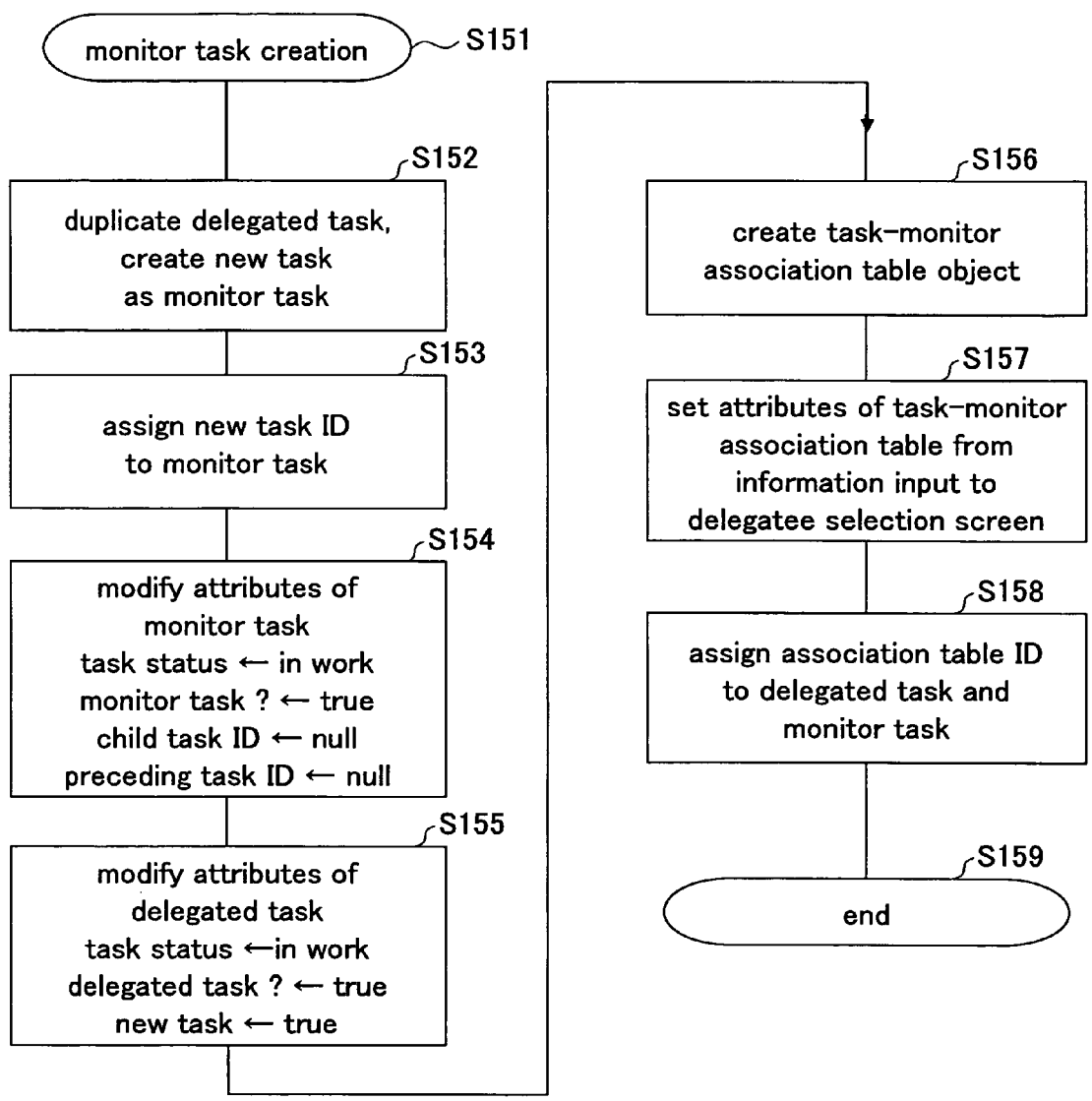
FIG. 13 is a flow chart illustrating operations of step S137 in FIG. 9 for creating a monitor task.

FIG. 13 is a flow chart illustrating operations of step S137 in FIG. 9 for creating a monitor task.

As shown in FIG. 13, in step S151, the routine of monitor task creation is started.

In step S152, the delegated task is duplicated, and a new task is created to be the monitor task.

In step S153, a new task ID is assigned to the monitor task.

In step S154, attributes of the monitor task are changed. Specifically, the "task status" is changed to be "in work", the "monitor task ?" is changed to be "true", the "child task ID" is changed to be "null", and the "preceding task ID" is changed to be "null".

In step S155, attributes of the delegated task are changed. Specifically, the "task status" is changed to be "in work", the "delegated task ?" is changed to be "true", and the "new task" is changed to be "true".

In step S156, a task-monitor association table object is created.

In step S157, attributes of the task-monitor association table are set from information input to the delegatee selection screen.

In step S158, an association table ID is assigned to the delegated task and the monitor task.

In step S159, the routine ends.

Figure 14:
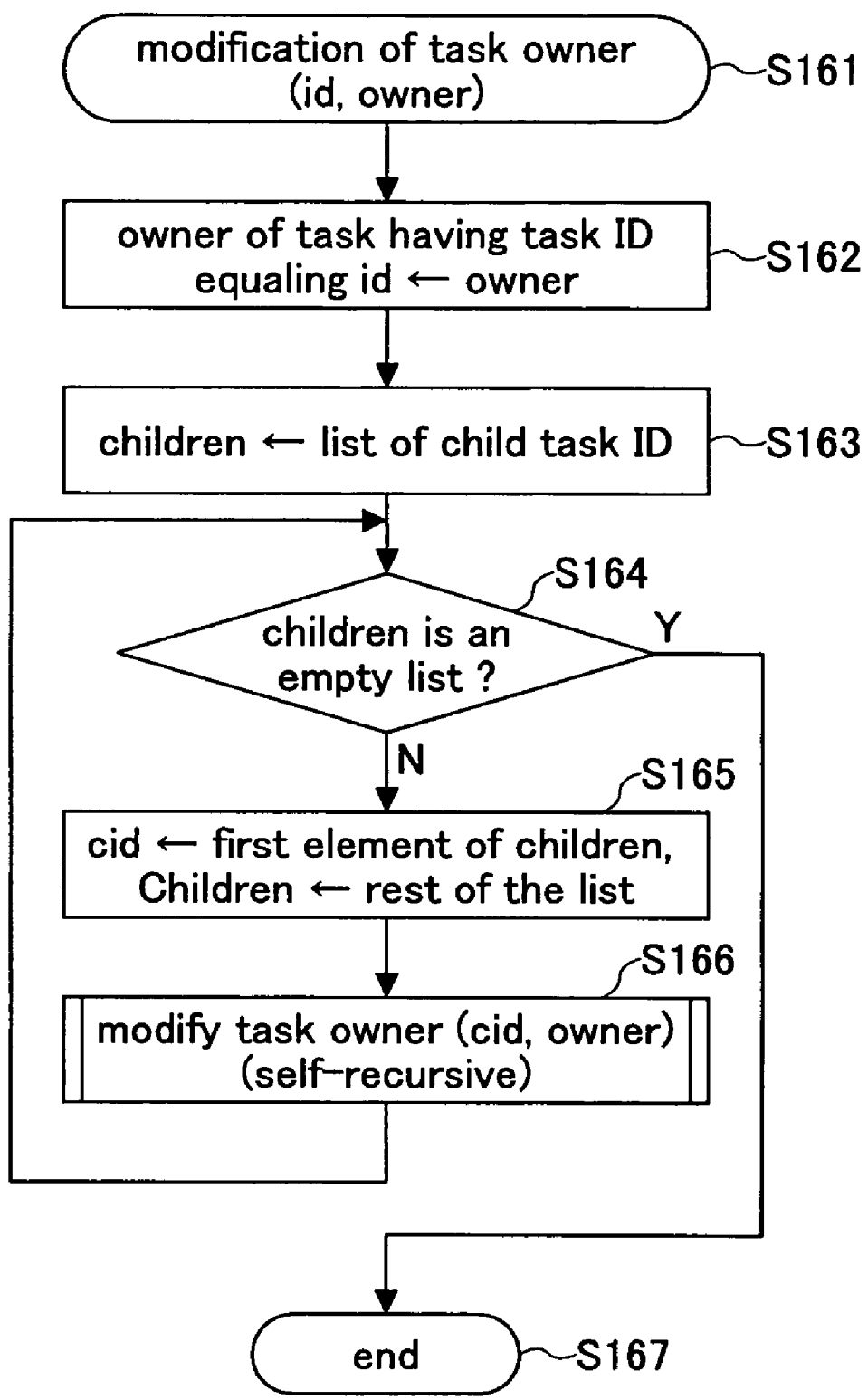
FIG. 14 is a flow chart illustrating operations of step S140 in FIG. 9 for changing the owner of the delegated task.

FIG. 14 is a flow chart illustrating operations of step S140 in FIG. 9 for changing the owner of the delegated task.

As shown in FIG. 14, in step S161, the routine of changing the task owner is started.

In step S162, the owner of the task having the task ID equaling "id" is regarded as the task owner.

In step S163, a list of the child task ID is given to "children".

In step S164, it is determined whether "children" is an empty list. If "children" is an empty list, the routine ends in step S167. Otherwise, the routine proceeds to step S165.

In step S165, the first element of "children" is given to "cid", and the rest of the list remains in "children".

In step S166, a procedure of changing the task owner is invoked self-recursively. Then, the routine returns to step S164 to determine whether "children" is an empty list. This routine stops in step S167 when "children" becomes an empty list.

FIG. 15A is a table exemplifying data of the delegated task after delegation.

FIG. 15B is a table exemplifying data of the monitor task after delegation.

In FIG. 15A and FIG. 15B, the shaded fields are modified.

Figure 16:
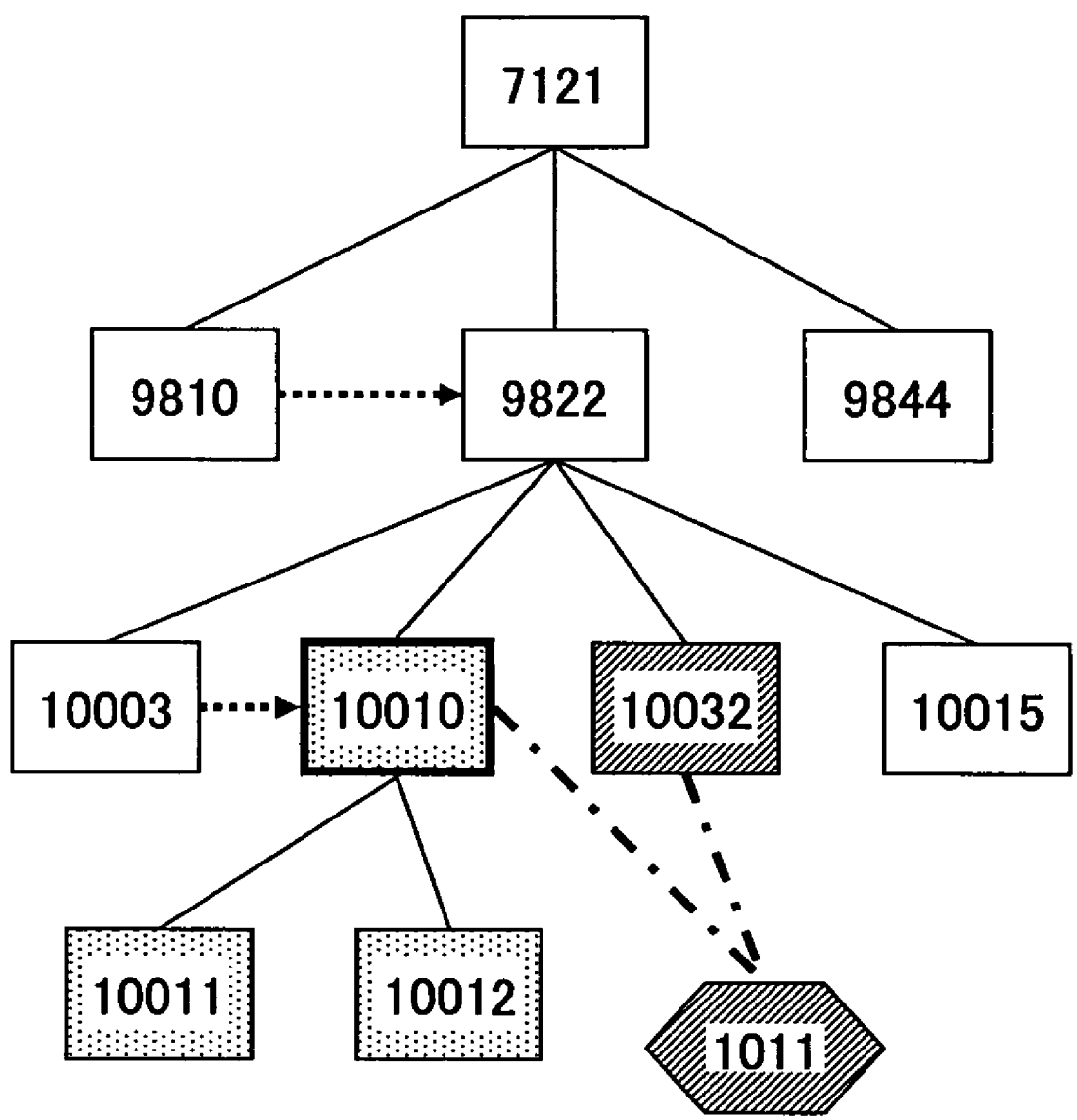
FIG. 16 is a block diagram illustrating the structure of the tasks after delegation.

FIG. 16 is a block diagram illustrating the structure of the tasks after delegation.

In FIG. 16, owners of a delegated task (task ID: 10010) and child tasks (task ID: 10011, 10012) are changed, and a monitor task (task ID: 10032) is created, the delegated task (task ID: 10010) and the monitor task (task ID: 10032) are associated through an object of the task monitor association table (task monitor association ID: 1011).

Figure 17:
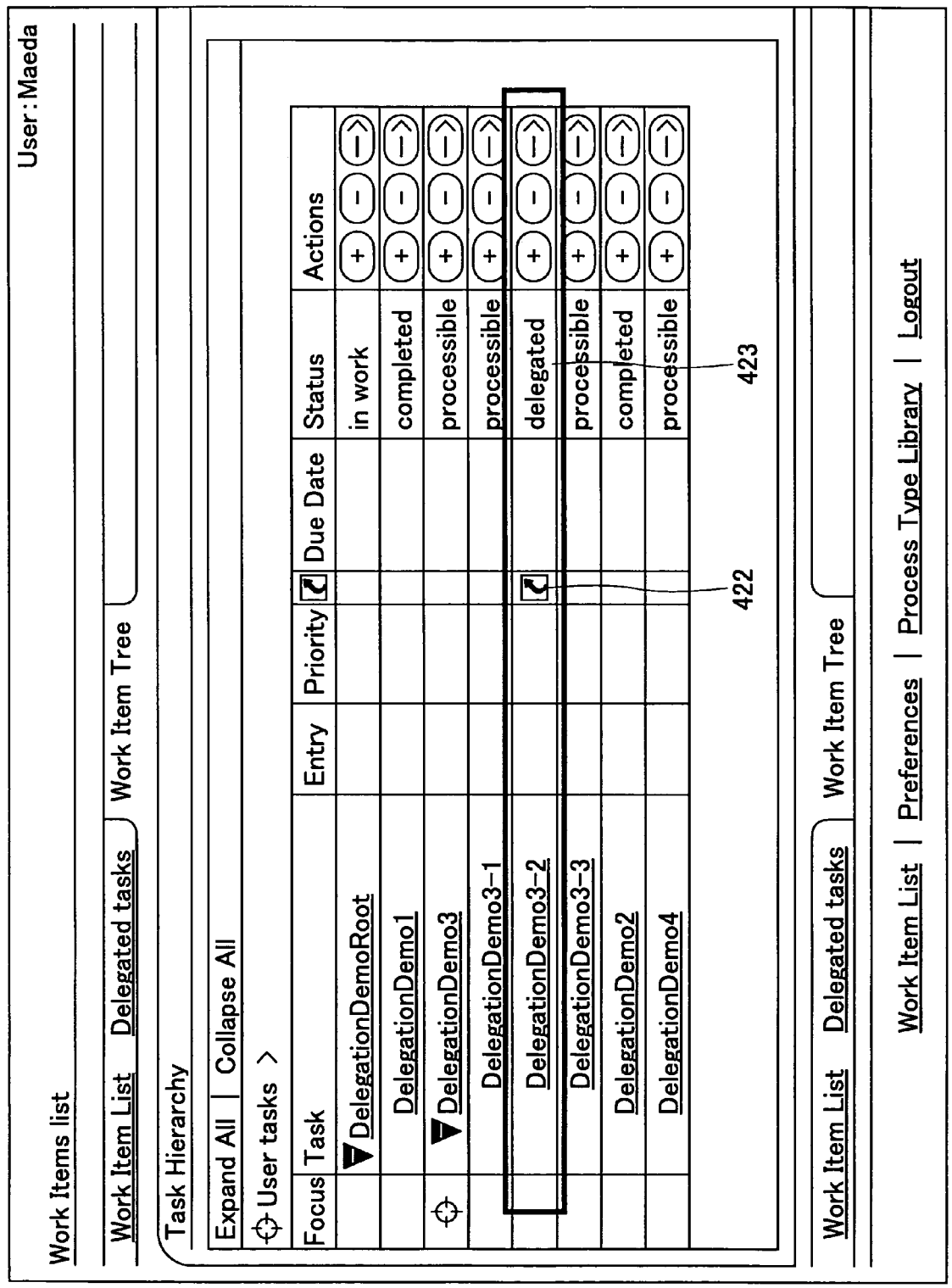
FIG. 17 is a schematic diagram exemplifying a task list screen 421 after delegation on the side of the delegator.

FIG. 17 is a schematic diagram exemplifying a task list screen 421 after delegation on the side of the delegator.

As show in FIG. 17, a symbol 422 indicates a delegated task is a monitor task, and a symbol 423 indicates a status of "delegated".

FIG. 18 is a schematic diagram exemplifying a task list screen 431 after the delegation is finished.

In FIG. 18, only the monitor tasks are selected for illustration.

Processing on Side of Delegatee

Figures 19A, 19B:
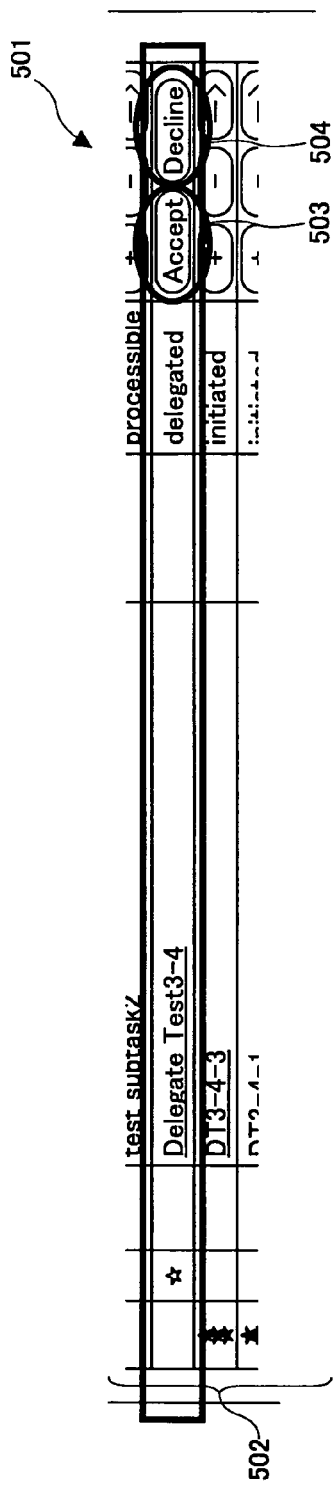
FIG. 19A is a schematic diagram exemplifying a task list screen 501 on the side of the delegate.
FIG. 19B is a schematic diagram exemplifying a task details screen 505.

FIG. 19A is a schematic diagram exemplifying a task list screen 501 on the side of the delegatee.

FIG. 19B is a schematic diagram exemplifying a task details screen 505.

In FIG. 19A, for the delegated task, an accept button 503 and a decline button 504 are displayed on a task list 502 of the task list screen 501. In FIG. 19B, an accept button 506 and a decline button 507 are displayed on the task details screen 505, and a symbol 508 is shown to indicate a status of "delegated".

FIG. 20 is a sequence diagram illustrating operations of delegation acceptance.

As shown in FIG. 20, in step S201, the delegatee U2 presses a delegation acceptance button on the task list screen on the browser 202 of the delegatee U2.

In step S202, the task management tool 101 requests the workflow engine 102 to accept the delegation.

In step S203, as one step of accepting the delegation, the workflow engine 102 modifies task attributes.

In step S204, the workflow engine 102 modifies the access right.

In step S205, the workflow engine 102 notifies the task management tool 101 of the modified task attributes.

In step S206, the task management tool 101 reports the results to the browser 202 of the delegatee U2.

In step S207, the workflow engine 102 requests the SMTP server 111 to send a notification mail message.

In step S208, the SMTP server 111 sends the mail message to the mail reader 301 of the delegator U1.

FIG. 21A is a table exemplifying data of the delegated task before delegation acceptance.

FIG. 21B is a table exemplifying data of the monitor task before delegation acceptance.

Figure 22:
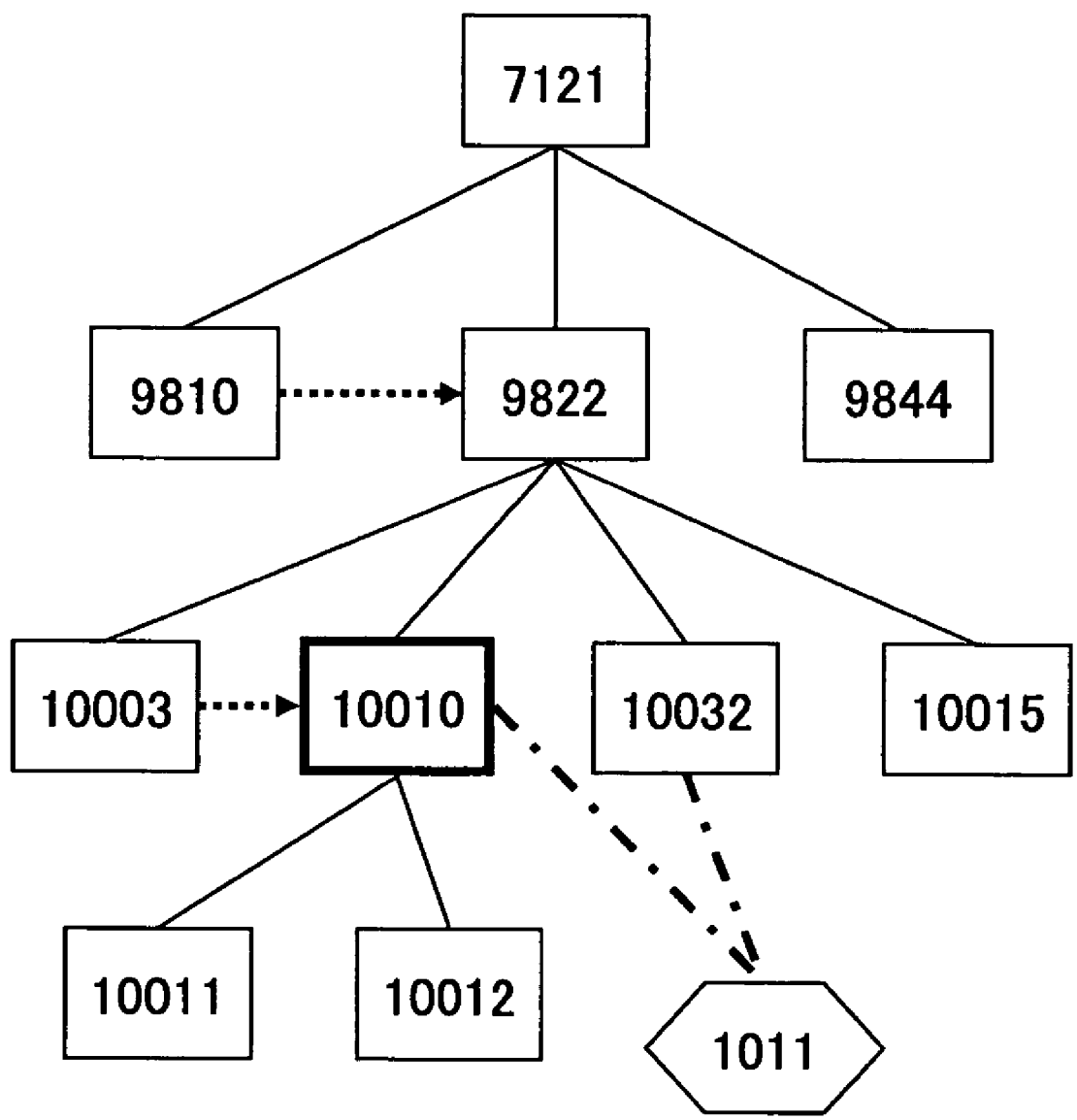
FIG. 22 is a block diagram illustrating the structure of the tasks before delegation acceptance.

FIG. 22 is a block diagram illustrating the structure of the tasks before delegation acceptance.

Figure 23:
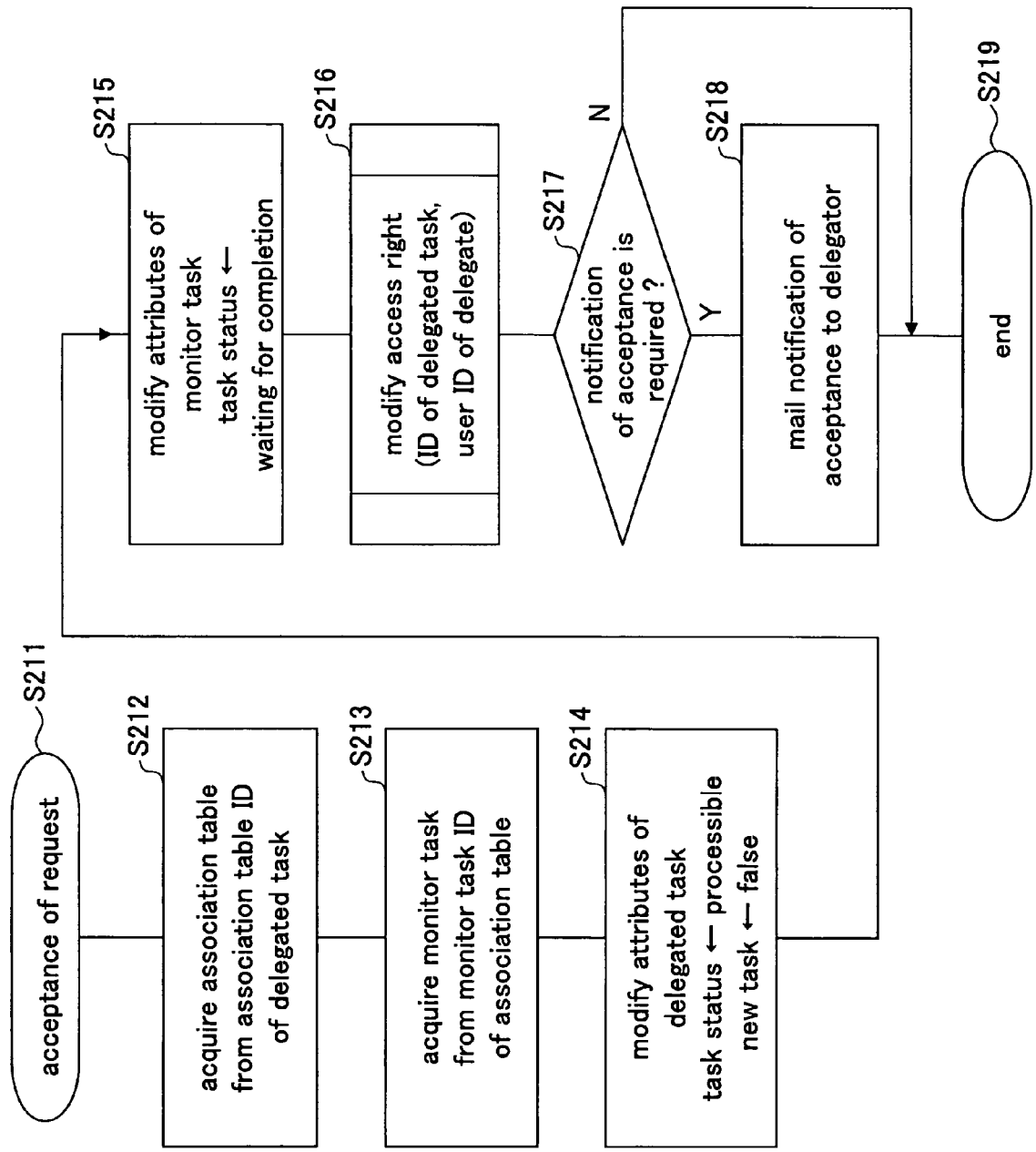
FIG. 23 is a flowchart illustrating operations of delegation acceptance.

FIG. 23 is a flowchart illustrating operations of delegation acceptance.

As shown in FIG. 23, in step S211, the routine of delegation acceptance is started.

In step S212, an association table is obtained from an association table ID of the delegated task.

In step S213, a monitor task is obtained from a monitor task ID of the association table.

In step S214, attributes of the delegated task are modified. Specifically, the "task status" is modified to be "processible", and the "new task" is changed to be "false".

In step S215, attributes of the monitor task are modified. Specifically, the "task status" is modified to be "waiting for completion".

In step S216, the access right is modified, such as, the task ID of the delegated task, and the user ID of the delegate.

In step S217, it is determined whether a notification is required when the delegation is accepted. If the notification is required, the routine proceeds to step S218, otherwise, to step S219 to complete the routine.

In step S218, a notification mail message is sent to the delegator U1.

In step S219, the routine ends.

Figure 24A:
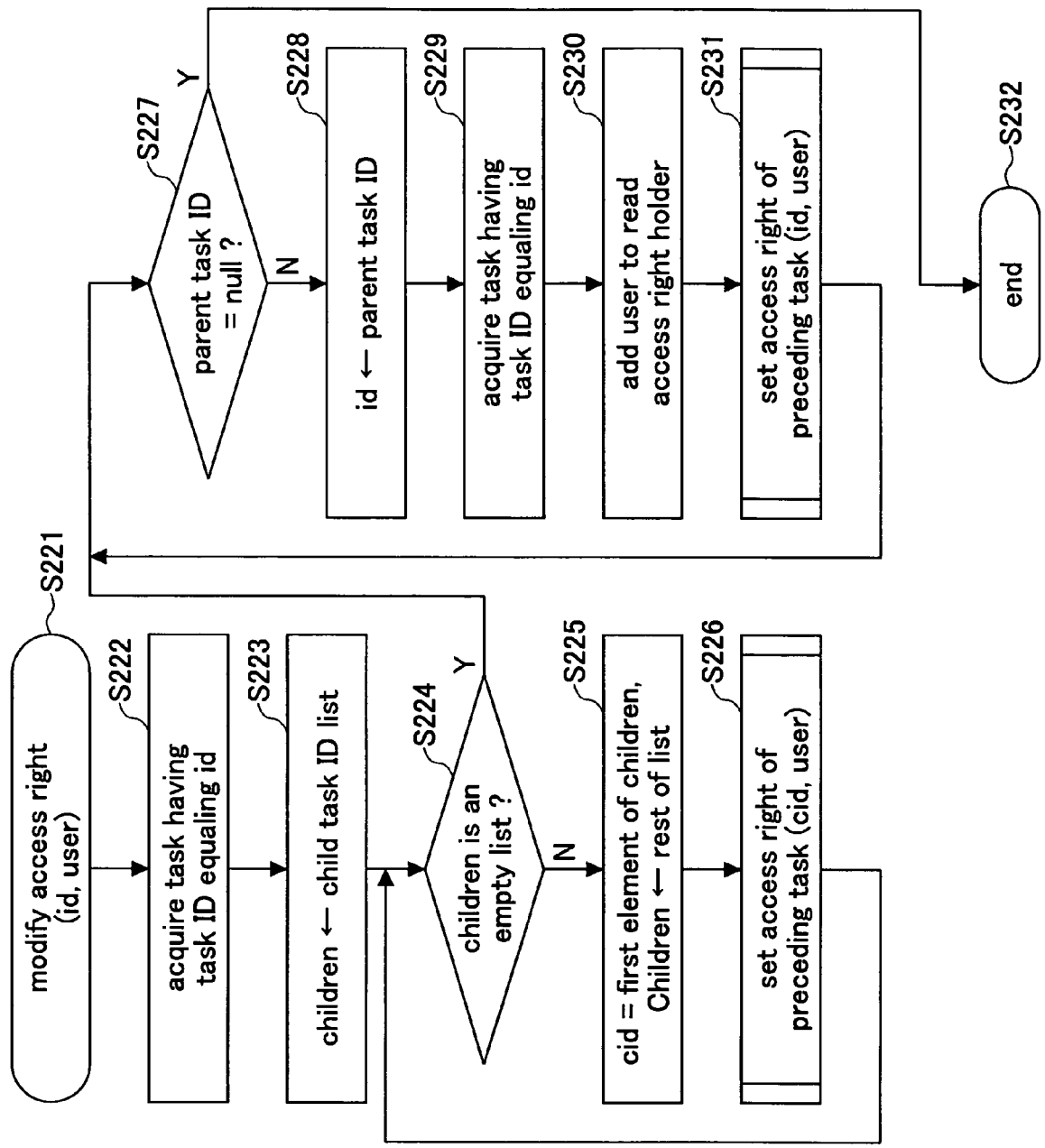
FIG. 24A and FIG. 24B are flowcharts illustrating operations of modifying access right.
Figure 24B:
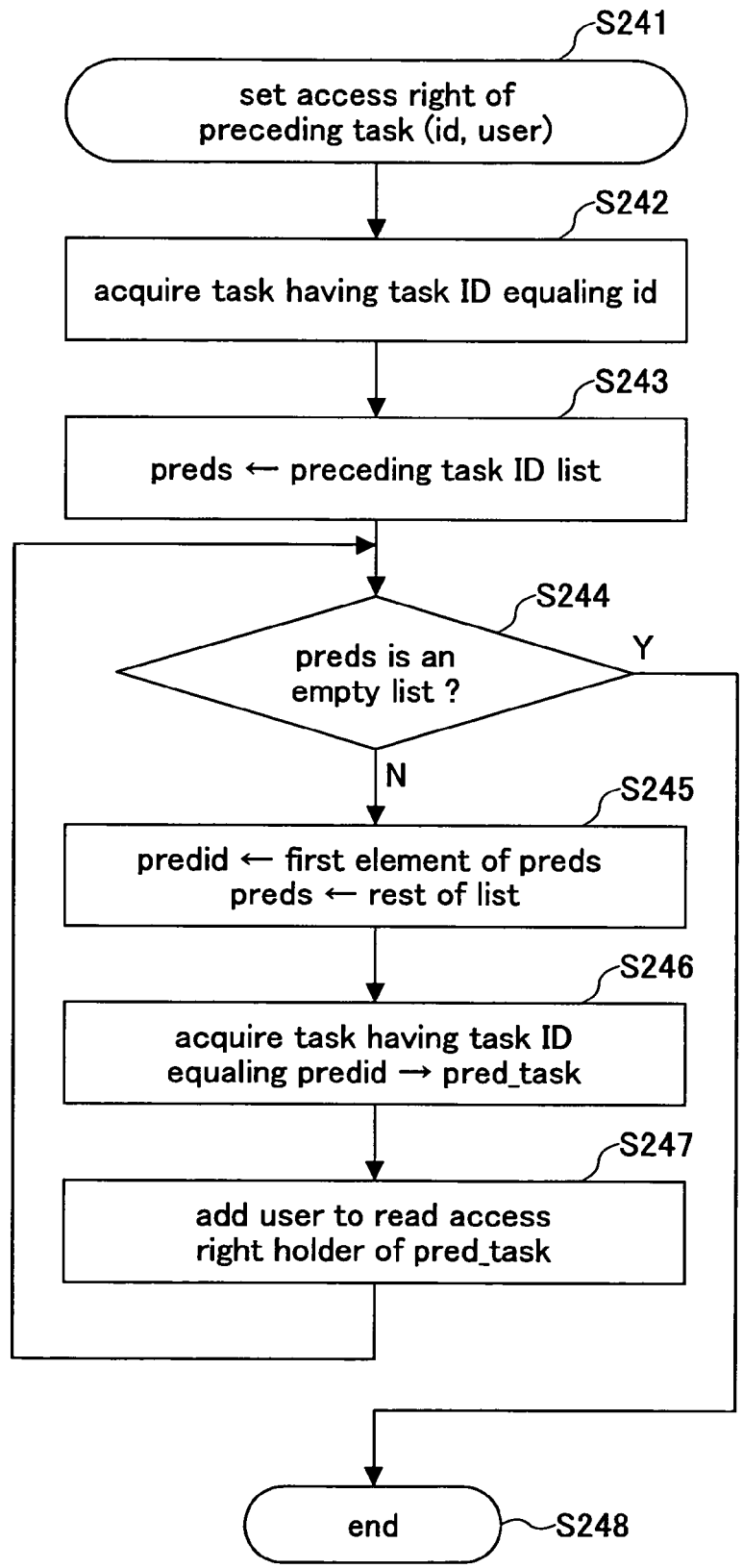

FIG. 24A and FIG. 24B are flowcharts illustrating operations of modifying access right.

Specifically, FIG. 24A illustrates operations of modifying the access right, and FIG. 24B illustrates operations of setting the access right of a preceding task in FIG. 24A.

As shown in FIG. 24A, in step S221, the routine of access right modification is started by specifying "id" and "user".

In step S222, a task having a task ID equaling "id" is obtained.

In step S223, a list of the child task ID is given to "children".

In step S224, it is determined whether "children" is an empty list. If "children" is an empty list, the routine proceeds to step S227. Otherwise, the routine proceeds to step S225.

In step S225, the first element of "children" is given to "cid", and the rest of the list remains in "children".

In step S226, the access right of the preceding task is set by specifying "cid" and "user".

In step S227, when "children" becomes an empty list, it is determined whether the parent task ID is null. If the parent task ID is null, the routine proceeds to step S232, otherwise, the routine proceeds to step S228.

In step S228, the parent task ID is given to "id".

In step S229, a task having a task ID equaling "id" is obtained.

In step S230, "user" is added to be a read-access right holder.

In step S231, the access right of the preceding task is set by using "cid" and "user", and the routine returns to step S227 to determine whether the parent task ID is null.

In step S232, when the parent task ID becomes null, the routine ends.

As shown in FIG. 24B, in step S241, the routine of setting the access right of the preceding task by specifying "id" and "user" is started.

In step S242, a task having a task ID equaling "id" is obtained.

In step S243, a list of the preceding task ID is given to "preds".

In step S244, it is determined whether "preds" is an empty list. If "preds" is an empty list, the routine proceeds to step S248, otherwise, the routine proceeds to step S245.

In step S245, the first element of "preds" is given to "predid", and the rest of the list remains in "preds".

In step S246, a task having a task ID equaling "predid" is obtained. This task is referred to as "pred_task".

In step S247, "user" is added as a read access-right holder of the pred_task, and the routine returns to step S244 to determine whether the "preds" is an empty list.

In step S248, when the "preds" becomes an empty list, the routine ends.

FIG. 25A is a table exemplifying data of the delegated task after delegation acceptance.

FIG. 25B is a table exemplifying data of the monitor task after delegation acceptance.

In FIG. 25A and FIG. 25B, the shaded fields are modified.

Figure 26:
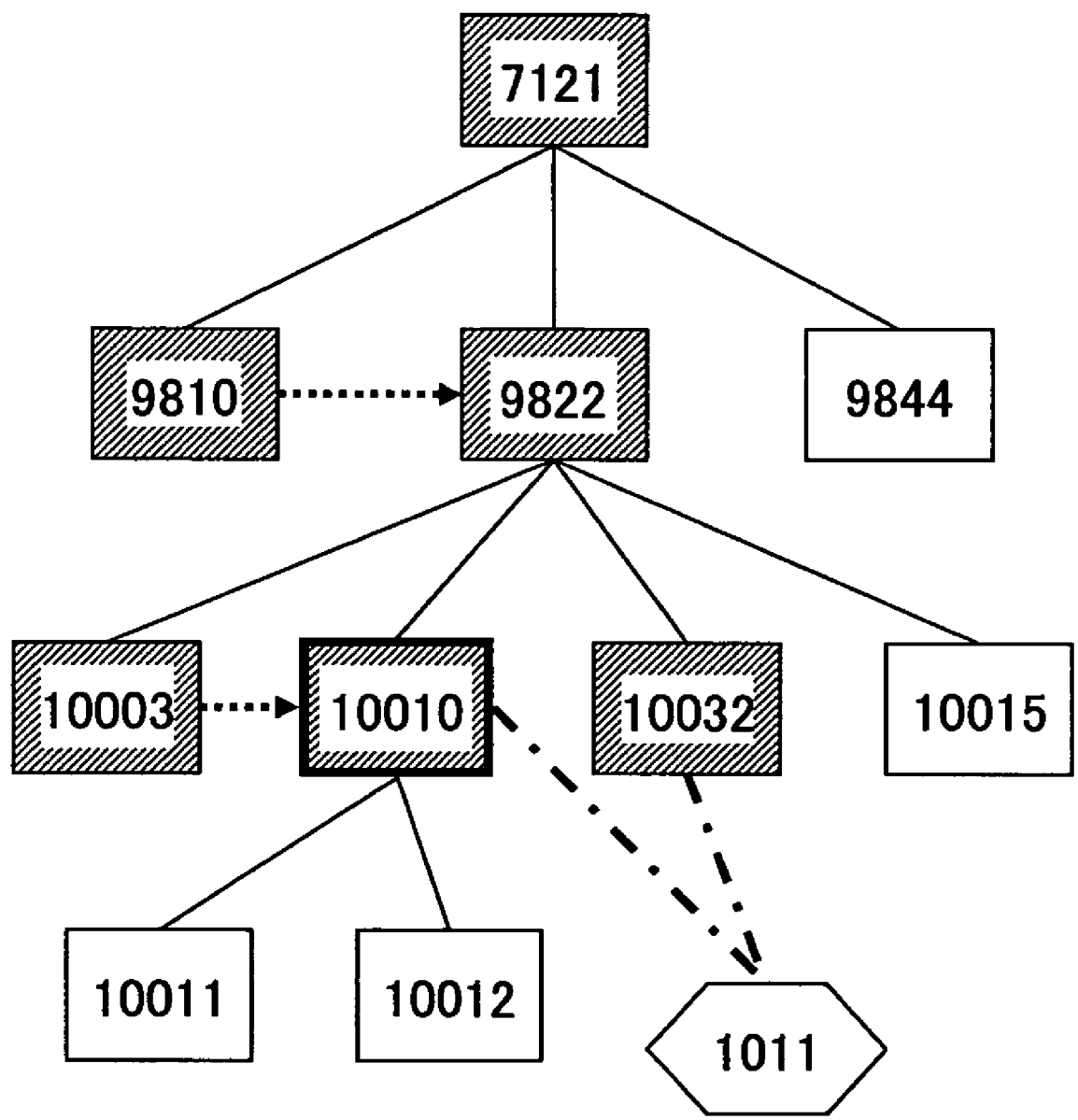
FIG. 26 is a block diagram illustrating the structure of the tasks after delegation acceptance.

FIG. 26 is a block diagram illustrating the structure of the tasks after delegation acceptance.

In FIG. 26, the preceding tasks and the parent task are accessible, the delegatee is additionally granted access right of reading tasks having task IDs 9810, 10003, 7121, and 9822.

FIG. 27 is a schematic diagram exemplifying a task details screen 511 on the delegate side after delegation acceptance.

Figure 28:
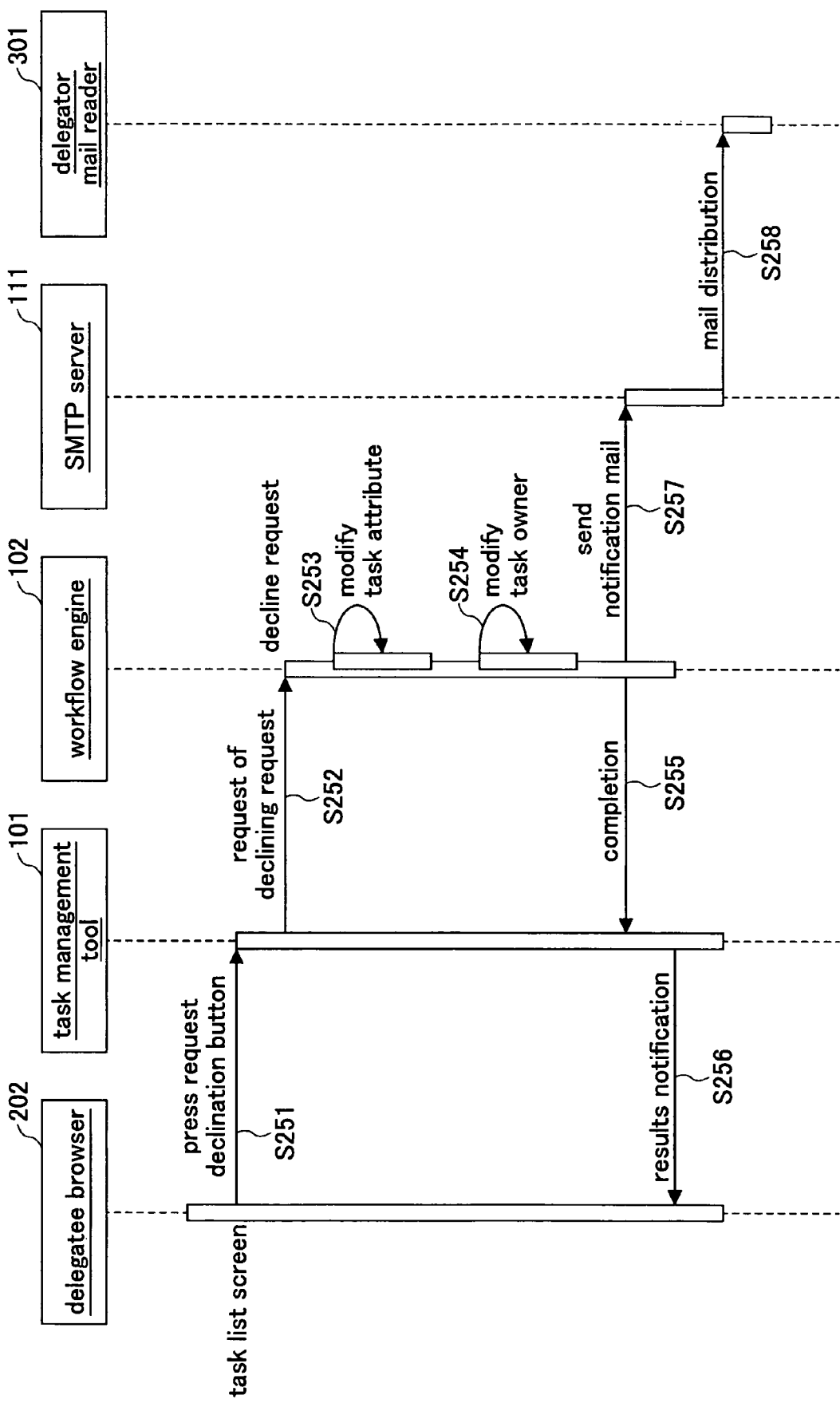
FIG. 28 is a sequence diagram illustrating operations of delegation declination.

FIG. 28 is a sequence diagram illustrating operations of delegation declination.

As shown in FIG. 28, in step S251, the delegatee U2 presses a delegation declination button on the task list screen on the browser 202 of the delegatee U2.

In step S252, the task management tool 101 requests the workflow engine 102 to decline the delegation.

In step S253, as one step of declining the delegation, the workflow engine 102 modifies the task attributes.

In step S254, the workflow engine 102 modifies the task owner.

In step S255, the workflow engine 102 notifies the task management tool 101 of completion of the routine.

In step S256, the task management tool 101 reports the results to the browser 202 of the delegatee U2.

In step S257, the workflow engine 102 requests the SMTP server 111 to send a notification mail message.

In step S258, the SMTP server 111 sends the mail message to the mail reader 301 of the delegator U1.

FIG. 29A is a table exemplifying data of the delegated task before delegation declination.

FIG. 29B is a table exemplifying data of the monitor task before delegation declination.

Figure 30:
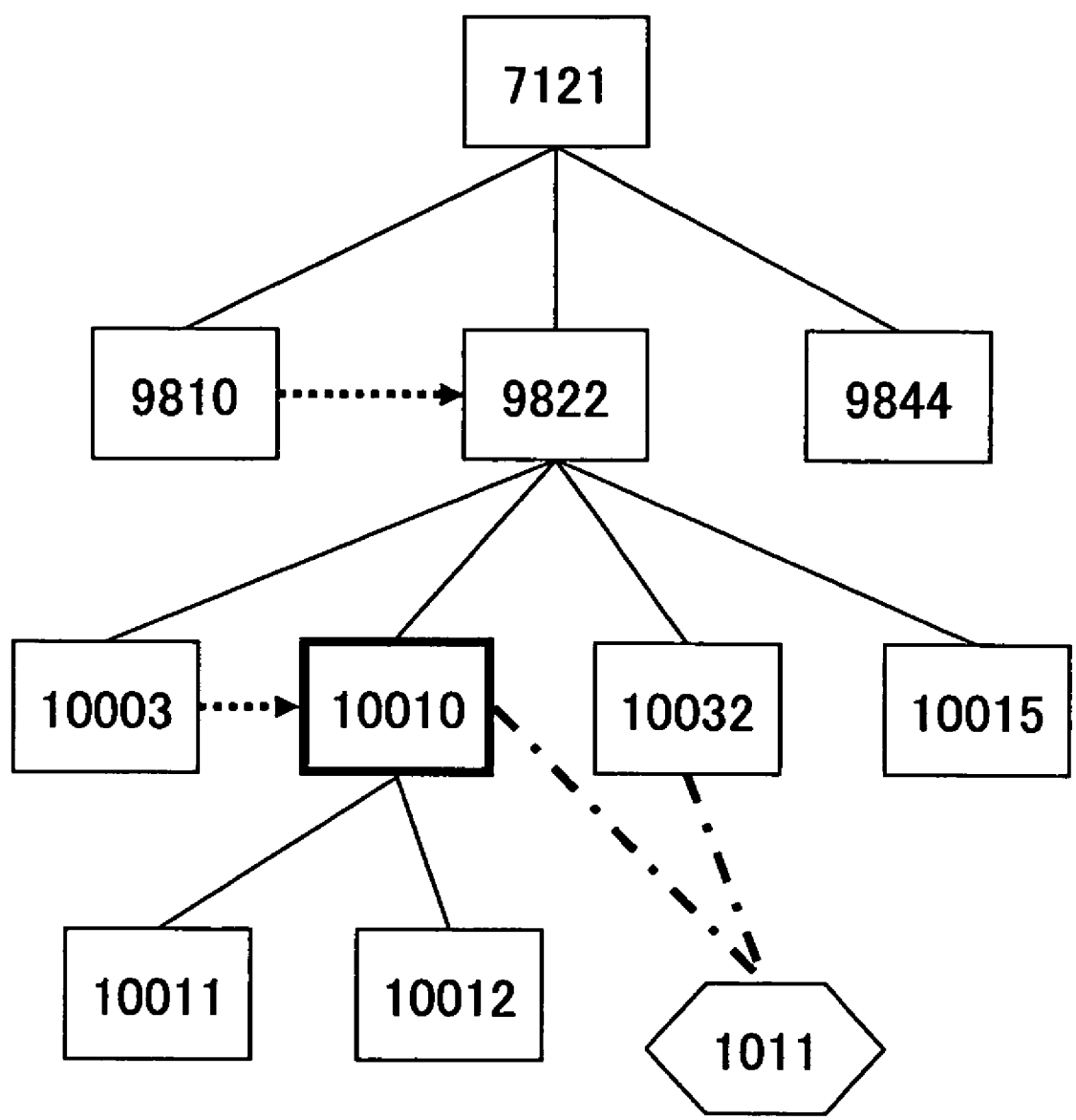
FIG. 30 is a block diagram illustrating the structure of the tasks before delegation declination.

FIG. 30 is a block diagram illustrating the structure of the tasks before delegation declination.

Figure 31:
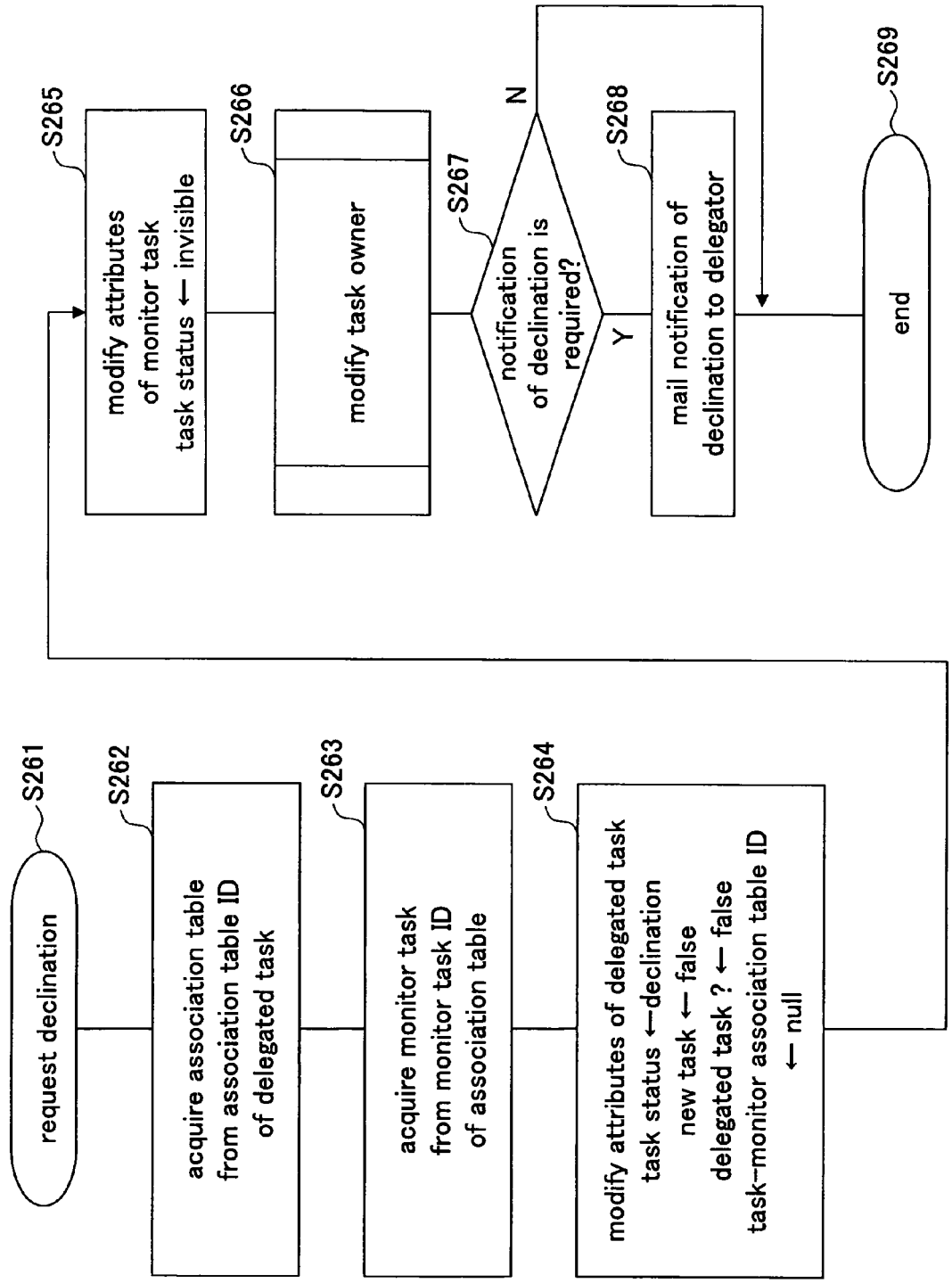
FIG. 31 is a flowchart illustrating operations of delegation declination.

FIG. 31 is a flowchart illustrating operations of delegation declination.

As shown in FIG. 31, in step S261, the routine of delegation declination is started.

In step S262, an association table is obtained from an association table ID of the delegated task.

In step S263, a monitor task is obtained from a monitor task ID of the association table.

In step S264, attributes of the delegated task are modified. Specifically, the "task status" is modified to be "declined", the "new task" is modified to be "false", the "delegated task ?" is modified to be "false", the "task-monitor association table ID" is modified to be "null".

In step S265, attributes of the monitor task are modified. Specifically, the "task status" is modified to be "invisible".

In step S266, the task owner is modified.

In step S267, it is determined whether a notification is required when the delegation is of declined. If a notification is required, the routine proceeds to step S268, otherwise, to step S269 to end the routine.

In step S268, a notification mail message is sent to the delegator U1.

In step S269, the routine ends.

FIG. 32A is a table exemplifying data of the delegated task after delegation declination.

FIG. 32B is a table exemplifying data of the monitor task after delegation declination.

In FIG. 32A and FIG. 32B, the shaded fields are modified.

Figure 33:
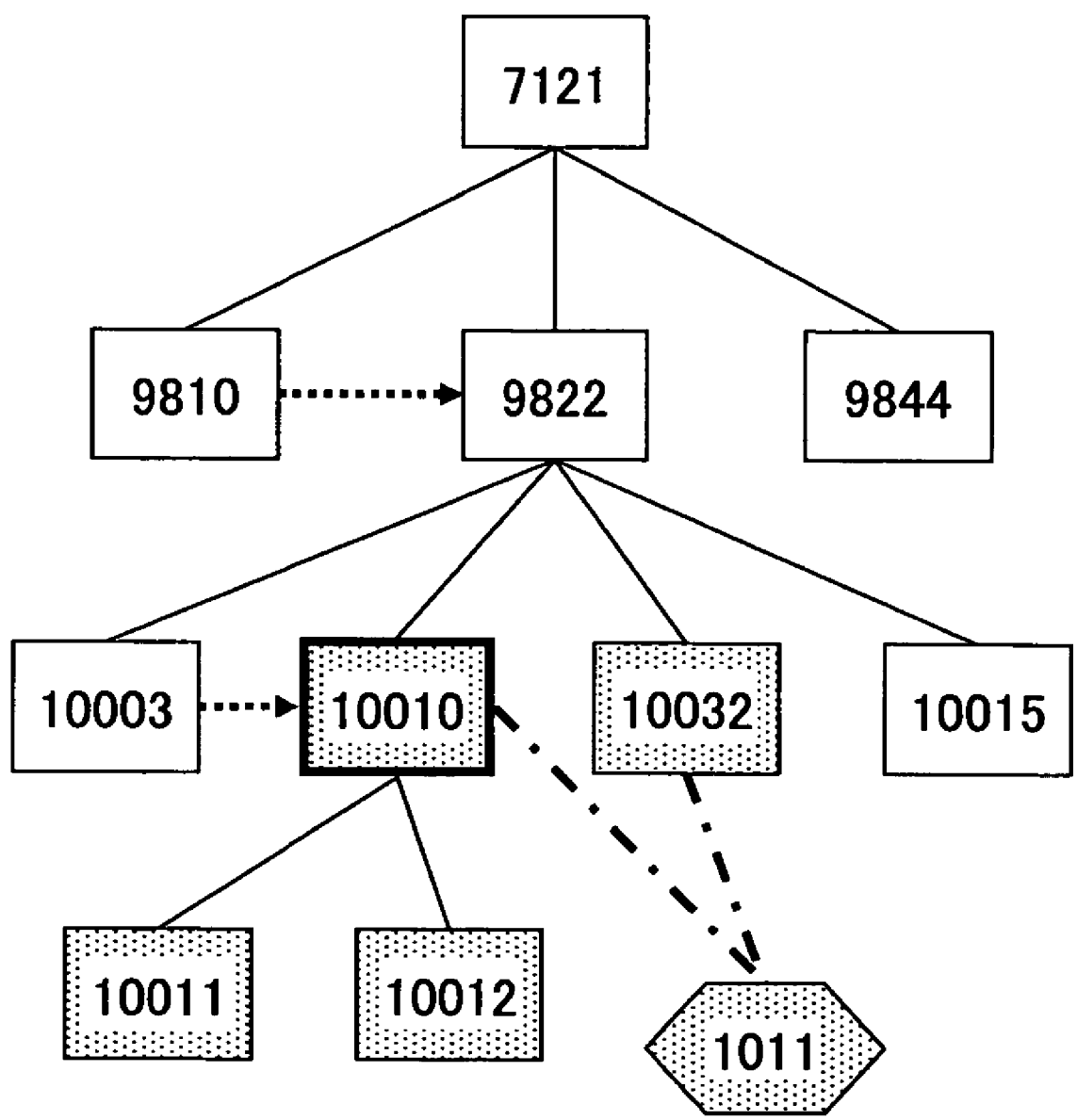
FIG. 33 is a block diagram illustrating the structure of the tasks after delegation declination.

FIG. 33 is a block diagram illustrating the structure of the tasks after delegation declination.

In FIG. 33, owners of the declined task (task ID: 10010) and its children tasks (task ID: 10011, 10012) are modified to be the original delegator, and the monitor task (task ID: 10032) is set to be invisible.

Figure 34:
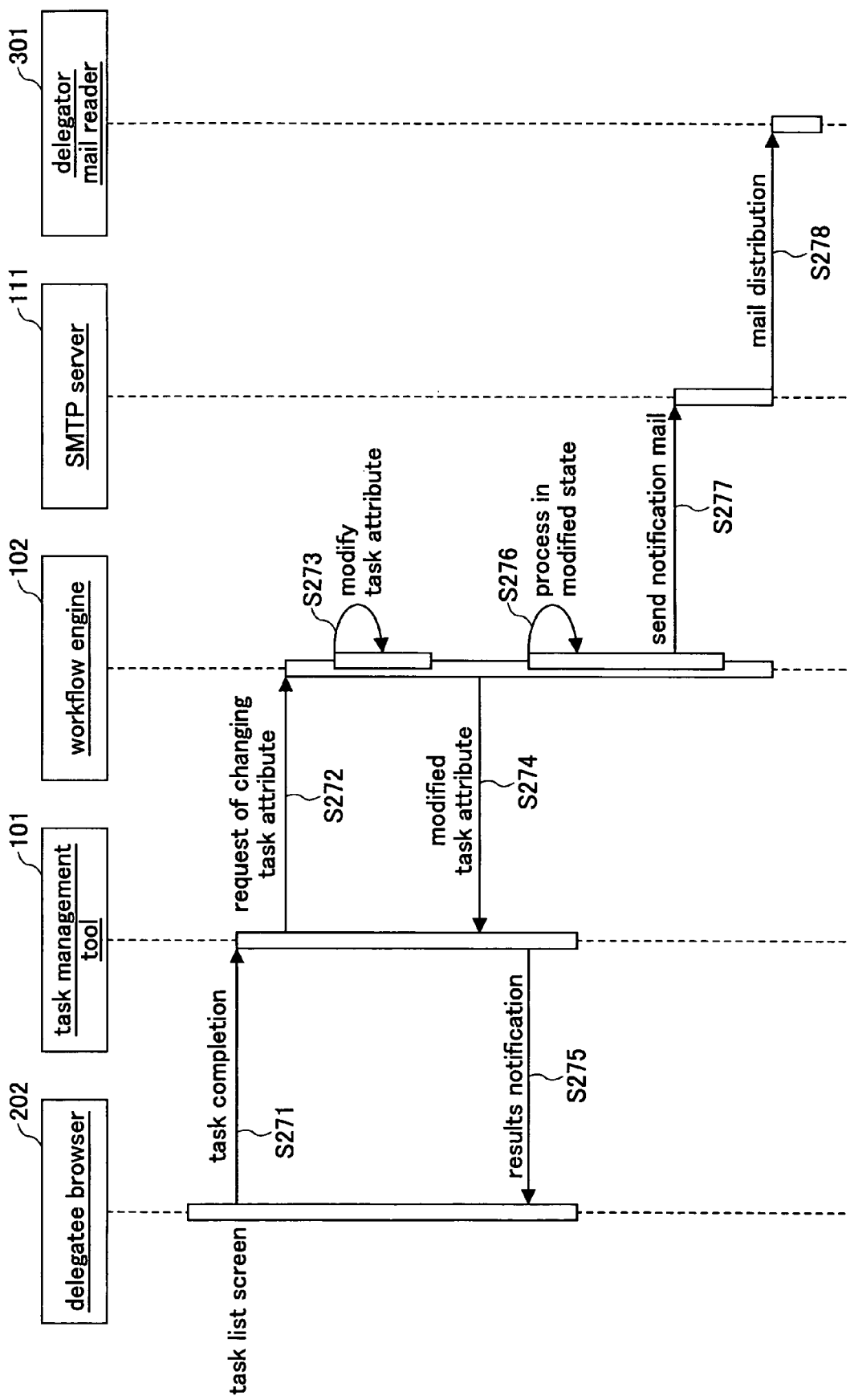
FIG. 34 is a sequence diagram illustrating operations of delegated task completion and task attribute modification.

FIG. 34 is a sequence diagram illustrating operations of delegated task completion and task attribute modification.

As shown in FIG. 34, in step S271, the delegatee U2 inputs task completion from the task list screen on the browser 202 of the delegatee U2.

In step S272, the task management tool 101 requests the workflow engine 102 to modify the task attributes.

In step S273, the workflow engine 102 modifies the task attributes.

In step S274, the workflow engine 102 notified the task management tool 101 of the modified task attributes.

In step S275, the task management tool 101 presents the results in the browser 202.

In step S276, the workflow engine 102 performs operations after task status modification.

In step S277, the workflow engine 102 requests the SMTP server 111 to send a notification mail message.

In step S278, the SMTP server 111 sends the mail message to the mail reader 301 of the delegator U1.

Figure 35:
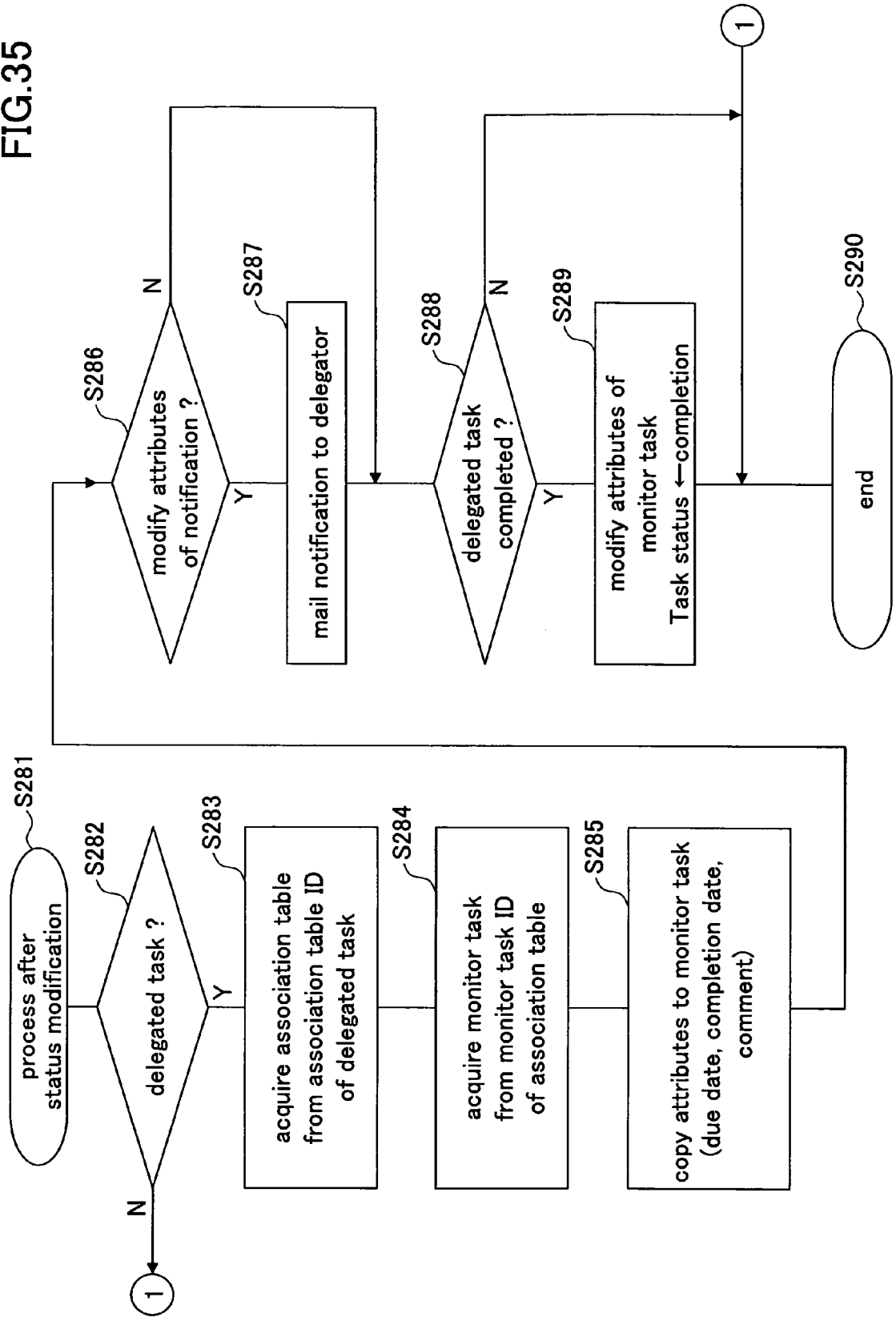
FIG. 35 is a flowchart illustrating operations after task status modification.

FIG. 35 is a flowchart illustrating operations after task status modification.

As shown in FIG. 35, in step S281, the routine after task status modification is started.

In step S282, it is determined whether the task under processing is a delegated task. If it is a delegated task, the routine proceeds to step S283, otherwise, to step S290 to end the routine.

In step S283, an association table is obtained from an association table ID of the delegated task.

In step S284, a monitor task is obtained from a monitor task ID of the association table.

In step S285, attributes of the delegated task, such as, "due date", "completion date", "comment", are duplicated to the monitor task.

In step S286, it is determined whether attributes of the notification object are to be modified. If the attributes are to be modified, the routine proceeds to step S287, otherwise, to step S288.

In step S287, a notification mail message is sent to the delegator.

In step S288, it is determined whether the delegated task is completed. If the delegated task is completed, the routine proceeds to step S289, otherwise, to step S290 to end the routine.

In step S289, attributes of the monitor task are modified. Specifically, the "task status" is modified to be "completed".

In step S290, the routine ends.

FIG. 36A is a table exemplifying data of the delegated task after the delegated task is completed.

FIG. 36B is a table exemplifying data of the monitor task after the delegated task is completed.

In FIG. 36A and FIG. 36B, the shaded fields In FIG. 36A are duplicated to the monitor task.

Another Method of Implementing Task Monitoring

In the above embodiments, it is described that the monitor task monitors the delegated tasks. However, monitoring the delegated tasks can also be controlled by only the access right of the same object without creating the monitor task. In this case, for example, as to the subordinate task, the right of reading and editing is granted, and the right of access is granted when delegating or accepting the task (specifically, it can be set that the delegator can only read the delegated task, and the delegator cannot access the subordinate tasks), it is possible to monitor the delegated tasks.

Compared to monitoring the delegated task by control of the access rights, the above-described method of monitoring the delegated task by the monitor task has the following advantages.

(1) It is possible to hide attribute modification of the delegated task (disclosed only at the time of completion), because for the same object, it is possible to refer successively. However, setting the right of access in units of attributes is cumbersome.

(2) Setting the right of access of the objects (child task and relevant information), which are to be added to the delegated task, is simple, while setting the right of access of the child tasks to be added is difficult.

While the present invention is described with reference to specific embodiments chosen for purpose of illustration, it should be apparent that the invention is not limited to these embodiments, but numerous modifications could be made thereto by those skilled in the art without departing from the basic concept and scope of the invention.

This patent application is based on Japanese Priority Patent Application No. 2006-003497 filed on Jan. 11, 2006, the entire contents of which are hereby incorporated by reference.

What is claimed is:

1. A workflow management system for managing a workflow including a plurality of hierarchically-classified tasks, comprising:
   a task receiving device configured to receive designation of a task to be delegated;
   a delegatee receiving device configured to receive designation of a delegatee;
   an acceptance receiving device configured to receive, from the delegatee, acceptance of a delegation;
   a first processor that allows a delegator to hide a delegated task and a subordinate task, and allows the delegator to confirm status of the designated task; and
   a second processor that allows the delegator and the delegatee to refer to other tasks relevant to the delegated task,
   wherein the delegated task and the subordinate task are not accessible to the delegator after acceptance of the delegation.

2. The workflow management system as claimed in claim 1, wherein
   the first processor changes owners of the delegated task and the subordinate task to be the delegatee, and duplicates bibliographical information from the delegated task to create a monitor task accessible by the delegator.

3. The workflow management system as claimed in claim 2, wherein the first processor closes the monitor task when the delegated task is completed.

4. The workflow management system as claimed in claim 1, wherein the second processor additionally grants a right of reading other tasks relevant to the delegated task to the delegatee.

5. The workflow management system as claimed in claim 1, wherein the first processor sets the delegated task to be read-only relative to the delegator, and sets a right of access so that the subordinate task cannot be accessed by the delegator.

6. The workflow management system as claimed in claim 1, further comprising:
   a mail transmission device configured to send a notification mail message to the delegator when the delegation is accepted or rejected, the delegated task is completed or deleted, or a date is changed.

7. The workflow management system as claimed in claim 1, wherein the task receiving device receives a task to be delegated through a task list screen when a task delegation button corresponding to said task is pressed on the task list screen.

8. The workflow management system as claimed in claim 1, wherein the delegatee receiving device receives a user as the delegatee through a delegatee selection screen when a delegatee selection button corresponding to the user is pressed on the delegatee selection screen.

9. The workflow management system as claimed in claim 1, wherein the acceptance receiving device receives the acceptance of the delegation when an acceptance button is pressed on a task list screen or a task details screen, and receives declination of the delegation when a declination button is pressed on the task list screen or the task details screen.

10. A workflow management method, executed by a processor, for managing a workflow including a plurality of hierarchically-classified tasks, comprising:
    a task receiving step, executed by the processor, of receiving designation of a task to be delegated;
    a delegatee receiving step, executed by the processor, of receiving designation of a delegatee;
    an acceptance receiving step, executed by the processor, of receiving acceptance of a delegation from the delegatee;
    a first processing step, executed by the processor, of allowing a delegator to hide a delegated task and a subordinate task, and allowing the delegator to confirm status of the designated task; and
    a second processing step, executed by the processor, of allowing the delegator and the delegatee to refer to other tasks relevant to the delegated task,
    wherein the delegated task and the subordinate task are not accessible to the delegator after acceptance of the delegation from the delegatee.

11. The workflow management method as claimed in claim 10, wherein in the first processing step, owners of the delegated task and the subordinate task are changed to be the delegatee, and bibliographical information is duplicated from the delegated task to create a monitor task accessible by the delegator.

12. The workflow management method as claimed in claim 11, wherein in the first processing step, the monitor task is closed when the delegated task is completed.

13. The workflow management method as claimed in claim 10, wherein in the second processing step, a right of reading other tasks relevant to the delegated task is additionally granted to the delegatee.

14. The workflow management method as claimed in claim 10, wherein in the first processing step, the delegated task is set to be read-only relative to the delegator, and a right of access is set so that the subordinate task cannot be accessed by the delegator.

15. The workflow management method as claimed in claim 10, further comprising:

a mail transmission step of sending a notification mail message to the delegator when the delegation is accepted or rejected, the delegated task is completed or deleted, or a date is changed.

16. The workflow management method as claimed in claim 10, wherein in the task receiving step, a task is received to be delegated through a task list screen when a task delegation button corresponding to said task is pressed on the task list screen.

17. The workflow management method as claimed in claim 10, wherein in the delegatee receiving step, a user is received as the delegatee through a delegatee selection screen when a delegatee selection button corresponding to the user is pressed on the delegatee selection screen.

18. The workflow management method as claimed in claim 10, wherein in the acceptance receiving step, the acceptance of the delegation is received when an acceptance button is pressed on a task list screen or a task details screen, and declination of the delegation is received when a declination button is pressed on the task list screen or the task details screen.

19. A workflow management device for managing a workflow including a plurality of hierarchically-classified tasks, comprising:
- a task receiving unit configured to receive designation of a task to be delegated;
- a delegatee receiving unit configured to receive designation of a delegatee;
- an acceptance receiving unit configured to receive, from the delegatee, acceptance of a delegation;
- a first processor that allows a delegator to hide a delegated task and a subordinate task, and allows the delegator to confirm status of the designated task; and
- a second processor that allows the delegator and the delegatee to refer to other tasks relevant to the delegated task,
wherein the delegated task and the subordinate task are not accessible to the delegator after acceptance of the delegation.

* * * * *